(12) United States Patent
Inagaki et al.

(10) Patent No.: US 11,352,496 B2
(45) Date of Patent: Jun. 7, 2022

(54) RESIN COMPOSITION, METHOD OF PRODUCING RESIN COMPOSITION, AND MOLDED ARTICLE

(71) Applicant: ASAHI KASEI KABUSHIKI KAISHA, Tokyo (JP)

(72) Inventors: Nozomi Inagaki, Tokyo (JP); Mihoko Yamamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 16/625,909

(22) PCT Filed: Jun. 27, 2018

(86) PCT No.: PCT/JP2018/024458
§ 371 (c)(1),
(2) Date: Dec. 23, 2019

(87) PCT Pub. No.: WO2019/004317
PCT Pub. Date: Jan. 3, 2019

(65) Prior Publication Data
US 2020/0165447 A1    May 28, 2020

(30) Foreign Application Priority Data
Jun. 28, 2017    (JP) .............................. JP2017-126562

(51) Int. Cl.
*C08L 71/12* (2006.01)
(52) U.S. Cl.
CPC ......... *C08L 71/123* (2013.01); *C08L 2205/03* (2013.01); *C08L 2205/035* (2013.01)

(58) Field of Classification Search
CPC ............................... C08L 71/123; C08L 71/12
See application file for complete search history.

(56) References Cited

U.S. PATENT DOCUMENTS

| 4,299,757 A | 11/1981 | Kuribayashi et al. |
| 5,183,849 A * | 2/1993 | Yamaguchi ........... C08L 71/123 524/275 |

(Continued)

FOREIGN PATENT DOCUMENTS

| CN | 103154085 A | 6/2013 |
| CN | 105722911 A | 6/2016 |

(Continued)

OTHER PUBLICATIONS

Takamoto TPE Sixth International Conference on Thermoplastic Elastomers paper 21 pp. 181-185 (Year: 2003).*

(Continued)

*Primary Examiner* — Mark S Kaucher
(74) *Attorney, Agent, or Firm* — Kenja IP Law PC

(57) ABSTRACT

A resin composition of the present disclosure comprises (a) a polyphenylene ether resin; and (b) a graft copolymer wherein 30 to 70% by mass of an ethylene-α-olefin copolymer rubber latex having a gel content ratio of 30 to 90% by mass and a volume average particle diameter of a rubber dispersion of 0.2 to 1.0 μm is graft-polymerized with 30 to 70% by mass of an aromatic vinyl compound, wherein the (a) component forms a continuous phase.

18 Claims, 6 Drawing Sheets

(56) References Cited

U.S. PATENT DOCUMENTS

| | | | | |
|---|---|---|---|---|
| 5,539,050 | A | * | 7/1996 | Fujii .................. C08L 51/06 525/68 |
| 8,278,376 | B2 | | 10/2012 | Qiu et al. |
| 2004/0102551 | A1 | | 5/2004 | Sato et al. |
| 2005/0154100 | A1 | | 7/2005 | Kosaka et al. |
| 2011/0266024 | A1 | | 11/2011 | Qiu et al. |
| 2013/0231430 | A1 | | 9/2013 | I et al. |
| 2015/0376395 | A1 | | 12/2015 | Tao et al. |
| 2016/0237277 | A1 | * | 8/2016 | I ................. C08L 71/123 |

FOREIGN PATENT DOCUMENTS

| | | | | |
|---|---|---|---|---|
| DE | 19610327 | A1 | * 9/1996 | ........... C08L 51/04 |
| EP | 0466445 | A2 | 1/1992 | |
| JP | S4743174 | B1 | 10/1972 | |
| JP | S4975663 | A | 7/1974 | |
| JP | S55145752 | A | 11/1980 | |
| JP | H0468065 | A | 3/1992 | |
| JP | H07118518 | A | 5/1995 | |
| JP | 2004161929 | A | 6/2004 | |
| JP | 2005113047 | A | 4/2005 | |
| JP | 2006176697 | A | 7/2006 | |
| JP | 2007519782 | A | 7/2007 | |
| JP | 5422561 | B2 | 2/2014 | |
| JP | 2019006976 | A | 1/2019 | |
| WO | 2014126215 | A1 | 8/2014 | |
| WO | 2015050060 | A1 | 4/2015 | |
| WO | 2015108646 | A1 | 7/2015 | |

OTHER PUBLICATIONS

Dec. 31, 2019, International Preliminary Report on Patentability issued in the International Patent Application No. PCT/JP2018/024458.

Sep. 11, 2018, International Search Report issued in the International Patent Application No. PCT/JP2018/024458.

Mar. 26, 2020, the Supplementary European Search Report issued by the European Patent Office in the corresponding European Patent Application No. 18825151.6.

* cited by examiner

RESIN COMPOSITION, METHOD OF PRODUCING RESIN COMPOSITION, AND MOLDED ARTICLE

TECHNICAL FIELD

The present disclosure relates to a resin composition, a method of producing a resin composition, and a molded article.

BACKGROUND

Polyphenylene ethers (hereinafter, simply referred to as "PPEs") have advantages, such as high heat resistance, low specific gravity, and excellent flame retardancy, and thus have been widely used in a wide variety of applications, including office automation apparatuses and automobiles. Polyphenylene ethers are amorphous resins, and thus have the drawback of having limitations on their applications and usage environments to some extents due to their insufficient resistance to oils, fats and organic solvents.

Efforts have been made for improving the chemical resistance of PPEs for some applications by alloying a PPE resin with a crystallizable resin. Such resin alloys, however, experience a rapid decline in impact resistance in temperature regions of the glass transition temperature or lower of the crystallizable resin.

In order to overcome this issue, researches have been made efforts to enhance low-temperature impact resistances by adding a thermoplastic elastomer having a low glass transition temperature (for example, PTL 1).

Furthermore, addition of a relatively large amount of a thermoplastic elastomer has been proposed in order to give an impact resistance (for example, PTL 2 to 4).

CITATION LIST

Patent Literature

PTL 1: WO2015/50060
PTL 2: JP2004161929A
PTL 3: JP5422561B
PTL 4: JP2007519782A

SUMMARY

Technical Problem

The compositions disclosed in PTL 1, however, cannot provide a resin composition having a good tracking resistance, in addition to a low-temperature impact resistance and good chemical resistance. Furthermore, the compositions disclosed in PTLs 2 to 4 have limited applications due to their reduced vibration fatigue resistance characteristics, making their applications to mechanical parts and structural bodies difficult.

Thus, the present disclosure is directed to providing a resin composition and a molded article which have excellent low-temperature impact resistance, chemical resistance, and tracking resistance, and have a vibration fatigue resistance characteristic suitable for applications of mechanical parts and structural bodies, and a method of producing such a resin composition.

Solution to Problem

Having intensively studied solutions to the aforementioned problems, we discovered that a resin composition that contained a polyphenylene ether resin and a graft copolymer having a certain structure such that the polyphenylene ether resin formed a continuous phase, was capable of beneficially solving the aforementioned problems, and thereby accomplished the present disclosure.

Namely, the present disclosure is as follows.

[1] A resin composition comprising:
(a) a polyphenylene ether resin; and
(b) a graft copolymer wherein 30% by mass to 70% by mass of an ethylene-α-olefin copolymer rubber latex having a gel content ratio of 30% by mass to 90% by mass and a volume average particle diameter of a rubber dispersion of 0.2 μm to 1.0 μm is graft-polymerized with 30% by mass to 70% by mass of an aromatic vinyl compound,
wherein the (a) component forms a continuous phase.

[2] The resin composition of [1], further comprising (c) a first hydrogenated block copolymer,
wherein the (c) component is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, and
the polymer block B1 in the (c) component has a glass transition temperature of −50° C. or lower.

[3] The resin composition of [1] or [2], wherein the aromatic vinyl compound in the (b) component is styrene or α-methyl styrene.

[4] The resin composition of any one of [1] to [3], wherein the aromatic vinyl compound in the (b) component has a number average molecular weight in terms of standard polystyrene measured by gel permeation chromatography (GPC) of 10,000 or more and 50,000 or less.

[5] The resin composition of any one of [1] to [4], further comprising (e) a second hydrogenated block copolymer,
wherein the (e) component is a hydrogenated block copolymer in which at least a part of a block copolymer containing at least one polymer block A2 composed primarily of a vinylarene compound and at least one polymer block B2 composed primarily of a conjugated diene compound is hydrogenated, and/or a modified product of the hydrogenated block copolymer, and
the polymer block B2 in the (e) component has a glass transition temperature of higher than −50° C.

[6] The resin composition of [5], wherein
a proportion of a sum of 1,2-vinyl bonds and 3,4-vinyl bonds relative to double bonds in the conjugated diene compound unit included in the (e) component is more than 50% and 90% or less,
a content of the vinylarene compound unit in the (e) component is 30% by mass to 50% by mass, and
a hydrogenation ratio of double bonds in the conjugated diene compound unit contained in the (e) component is 80% to 100%.

[7] The resin composition of any one of [1] to [6], further comprising (d) an olefinic polymer constituted from an olefin excluding propylene.

[8] The resin composition of [7], wherein the (d) component is an ethylene-1-butene copolymer.

[9] The resin composition of [7] or [8], wherein the (d) component has a density of 0.87 g/cm³ or more.

[10] The resin composition of [9], wherein the density of the (d) component is 0.90 g/cm³ or more.

[11] A method of producing the resin composition of any one of [1] to [10], comprising the steps of:

(1-1) melt-kneading the (a) component and optionally the (e) component to obtain a kneaded product; and (1-2) adding the (b) component and optionally the (c) component and/or (d) component to the kneaded product obtained in the step (1-1), followed by further melt-kneading.

[12] A molded article comprising the resin composition of any one of [1] to [10].

[13] The resin composition of [1], wherein a morphology having a continuous phase and a domain containing the (b) component is formed, and an average particle diameter of the domain is 0.3 μm to 2.0 μm.

[14] The resin composition of [13], further comprising (c) a first hydrogenated block copolymer, wherein the (c) component is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, and the polymer block B1 in the (c) component has a glass transition temperature of −50° C. or lower.

[15] The resin composition of [13] or [14], wherein the aromatic vinyl compound in the (b) component is styrene or α-methyl styrene.

[16] The resin composition of any one of [13] to [15], wherein the aromatic vinyl compound in the (b) component has a number average molecular weight in terms of standard polystyrene measured by gel permeation chromatography (GPC) of 10,000 or more and 50,000 or less.

[17] The resin composition of any one of [13] to [16], further comprising (e) a second hydrogenated block copolymer, wherein the (e) component is a hydrogenated block copolymer in which at least a part of a block copolymer containing at least one polymer block A2 composed primarily of a vinylarene compound and at least one polymer block B2 composed primarily of a conjugated diene compound is hydrogenated, and/or a modified product of the hydrogenated block copolymer, and the polymer block B2 in the (e) component has a glass transition temperature of higher than −50° C.

[18] The resin composition of [17], wherein a proportion of a sum of 1,2-vinyl bonds and 3,4-vinyl bonds relative to double bonds in the conjugated diene compound unit included in the (e) component is more than 50% and 90% or less, a content of the vinylarene compound unit in the (e) component is 30% by mass to 50% by mass, and a hydrogenation ratio of double bonds in the conjugated diene compound unit contained in the (e) component is 80% to 100%.

[19] The resin composition of any one of [13] to [18], further comprising (d) an olefinic polymer constituted from an olefin excluding propylene.

[20] The resin composition of [19], wherein the (d) component is an ethylene-1-butene copolymer.

[21] The resin composition of [19] or [20], wherein the (d) component has a density of 0.87 g/cm$^3$ or more.

[22] The resin composition of [21], wherein the density of the (d) component is 0.90 g/cm$^3$ or more.

[23] A method of producing the resin composition of any one of [13] to [22], comprising the steps of:

(1-1) melt-kneading the (a) component and optionally the (e) component to obtain a kneaded product; and (1-2) adding the (b) component and optionally the (c) component and/or (d) component to the kneaded product obtained in the step (1-1), followed by further melt-kneading.

[24] A molded article comprising the resin composition of any one of [13] to [22].

Advantageous Effect

In accordance with the present disclosure, provided are a resin composition and a molded article which have excellent low-temperature impact resistance, chemical resistance, and tracking resistance, and have a vibration fatigue resistance characteristic suitable for applications of mechanical parts and structural bodies, and a method of producing such a resin composition.

DETAILED DESCRIPTION

Figure 1:
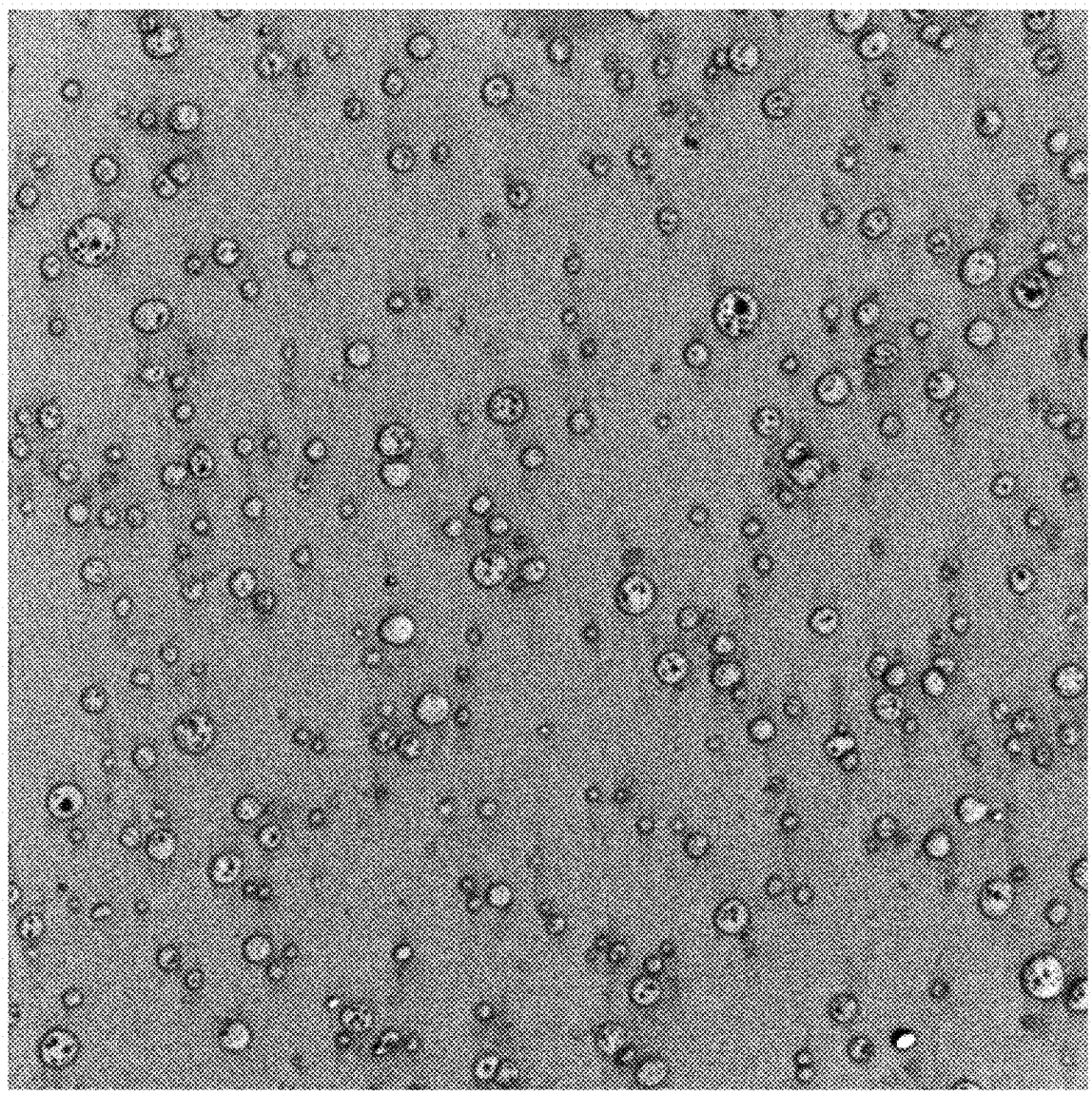
FIG. 1 is an image observed under a TEM (magnification: ×2,500) of one example of a resin composition of the present embodiment containing an (a) component and a (b) component, where a continuous phase containing the (a) component and oval domains containing the (b) component are formed.

In the following, an embodiment for embodying the present disclosure (hereinafter also referred to as "the present embodiment") will be described. However, the present disclosure is not limited to the following embodiment and may be implemented with a wide variety of modifications without departing from the scope thereof.

[Resin Composition]

A resin composition of the present embodiment is a resin composition containing (a) a polyphenylene ether resin; and (b) a graft copolymer wherein 30 to 70% by mass of an ethylene-α-olefin copolymer rubber latex having a gel content ratio of 30 to 90% by mass and a volume average particle diameter of a rubber dispersion of 0.2 to 1.0 μm is graft-polymerized with 30 to 70% by mass of an aromatic vinyl compound, wherein the (a) component forms a continuous phase.

Now, components of the resin composition of the present embodiment will be described.

The resin composition of the present embodiment has excellent low-temperature impact resistance, chemical resistance, and tracking resistance, and has a vibration fatigue resistance characteristic suitable for applications of mechanical parts and structural bodies. Also, the resin composition preferably has an excellent flame retardancy. In the present embodiment, excellent flame retardancy is defined as a flame retardancy at a level of V-1 or higher in a UL94 vertical burning test described in the Examples section below.

((a) Polyphenylene Ether Resin)

The (a) polyphenylene ether resin used in the present embodiment may be, but is not particularly limited to, a polyphenylene ether, a modified polyphenylene ether, or a mixture of both. One (a) component may be used alone or two or more (a) components may be used in combination.

The reduced viscosity of the (a) component is preferably 0.25 dL/g or more, and more preferably 0.28 dL/g or more, and is preferably 0.60 dL/g or less, more preferably 0.57 dL/g or less, and still more preferably 0.55 dL/g or less, in view of further improving the flame retardancy of the resin composition. The reduced viscosity may be controlled via the polymerization time and the catalyst amount.

Note that the reduced viscosity can be measured with an Ubbelohde viscosity tube by using a chloroform solution with $\eta_{sp}/c$ of 0.5 g/dL under the condition of a temperature of 30° C.

—Polyphenylene Ether—

The polyphenylene ether may be, but is not particularly limited to, a homopolymer formed from a repeating unit structure represented by the following formula (1) and/or a copolymer including a repeating unit structure represented by the following formula (1):

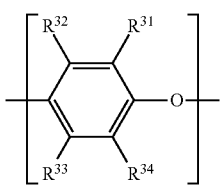
(1)

[in the formula, $R^{31}$, $R^{32}$, $R^{33}$, and $R^{34}$ are each independently a monovalent group selected from the group consisting of a hydrogen atom, a halogen atom, a primary alkyl group having a carbon atom number of 1 to 7, a secondary alkyl group having a carbon atom number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.]

Such polyphenylene ethers may be well-known ones without being limited thereto. Specific examples of the polyphenylene ether include homopolymers such as poly(2,6-dimethyl-1,4-phenylene ether), poly (2-methyl-6-ethyl-1,4-phenylene ether), and poly (2-methyl-6-phenyl-1,4-phenylene ether), poly (2,6-dichloro-1,4-phenylene ether); and copolymers such as copolymers of 2,6-dimethyl phenol and other phenols (e.g., 2,3,6-trimethyl phenol and 2-methyl-6-butyl phenol), for example. Of these, poly(2,6-dimethyl-1,4-phenylene ether) and copolymers of 2,6-dimethyl phenol and 2,3,6-trimethyl phenol are preferable, and poly(2,6-dimethyl-1,4-phenylene ether) is more preferable.

The method of preparing polyphenylene ether may be a conventionally known method, without being limited thereto. Specific examples of the method of preparing polyphenylene ether include the method disclosed in U.S. Pat. No. 3,306,874A, namely, producing polyphenylene ether via oxidative polymerization of 2,6-xylenol by using a complex of a cuprous salt and an amine as a catalyst; and the methods disclosed in U.S. Pat. Nos. 3,306,875A, 3,257,357A, 3,257,358A, JPS5217880B2, JPS5051197A, JPS63152628A, for example.

—Modified Polyphenylene Ether—

Examples of the modified polyphenylene ether include, but are not particularly limited to, those obtained by grafting and/or adding styrene polymers and/or derivatives thereof to the aforementioned polyphenylene ether. The ratio of mass increase by the grafting and/or addition is, but not particularly limited to, preferably 0.01% by mass or more; and is preferably 10% by mass or less, more preferably 7% by mass or less, and even more preferably 5% by mass or less, per 100% by mass of the modified polyphenylene ether.

The method of preparing the modified polyphenylene ether is not particularly limited, and may be a method in which the aforementioned polyphenylene ether is reacted with a styrene polymer and/or its derivative, in the presence or absence of a radical precursor, in a molten state, solution state, or slurry state, under the condition of 80 to 350° C.

In the case where the (a) component is a mixture of a polyphenylene ether and a modified polyphenylene ether, the mixing ratio of the polyphenylene ether and the modified polyphenylene ether is not particularly limited and may be any ratio.

((b) Graft Copolymer)

The (b) graft copolymer used in the present embodiment is a graft copolymer wherein 30 to 70% by mass of an ethylene-α-olefin copolymer rubber latex having a gel content ratio of 30 to 90% by mass and a volume average particle diameter of a rubber dispersion of 0.2 to 1.0 μm is graft-polymerized with 30 to 70% by mass of an aromatic vinyl compound.

Now, components constituting the (b) graft copolymer of the present embodiment will be described.

—Ethylene-α-Olefin Copolymer Rubber Latex—

The ethylene-α-olefin copolymer rubber latex of the present embodiment has a gel content ratio of 30 to 90% by mass, and a volume average particle diameter of rubber dispersion of 0.2 to 1.0 μm.

In the present embodiment, the gel content ratio of the ethylene-α-olefin copolymer rubber latex is required to be within a certain range in view of the low-temperature impact resistance of the composition. The gel content ratio of the ethylene-α-olefin copolymer rubber latex is 30 to 90% by mass, and is preferably 35 to 80% by mass and more preferably 35 to 70% by mass, in view of the low-temperature impact resistance of the composition.

The "gel content ratio" as used herein is defined as the content of rubber insoluble to toluene, in the ethylene-α-olefin copolymer rubber latex.

In the present disclosure, the gel content ratio of the ethylene-α-olefin copolymer rubber latex can be measured as follows.

Firstly, 0.5 g of the ethylene-α-olefin copolymer rubber latex is weighed as a coagulated powdery sample [W1]. The coagulated powdery sample [W1] is immersed in 200 mL of toluene at 110° C. for 5 hours, then the sample is filtrated through a metal gauze of 200 mesh. The resultant residue is dried, the weight of the dried sample [W2] is measured, and the gel content ratio is calculated in accordance with the following equation (2). In the case where the ethylene-α-olefin copolymer rubber latex is obtained as an aqueous dispersion or a solvent dispersion, the aqueous dispersion or the solvent dispersion of the ethylene-α-olefin copolymer rubber latex is coagulated using dilute sulfuric acid and is then washed with water and dried, and 0.5 g of the dried sample is weighed as a coagulated powdery sample [W1].

$$\text{Gel content ratio(\% by mass)} = \text{mass of dried sample } [W2] \text{ (g)/mass of coagulated powdery sample } [W1] \text{ (g)} \times 100 \quad (2)$$

In the present embodiment, the gel content ratio of the ethylene-α-olefin copolymer rubber latex can be controlled by adjusting the degree of cross-linking in cross-linking, for example.

The term "cross-linking" as used herein encompasses cross-linking a mixture of an ethylene-α-olefin copolymer and an acid-modified olefin polymer described later and cross-linking after preparation of an olefin resin aqueous dispersion containing an ethylene-α-olefin copolymer or the mixture, as well as cross-linking of an ethylene-α-olefin copolymer alone. An ethylene-α-olefin copolymer rubber latex may be a mixture of an ethylene-α-olefin copolymer which has been subjected to cross-linking alone and an acid-modified olefin polymer which has been subjected to cross-linking alone.

The volume average particle diameter of rubber dispersion in the ethylene-α-olefin copolymer rubber latex is 0.2 to 1.0 and is preferably 0.2 to 0.8 μm and more preferably 0.7 to 0.8 μm, in view of appropriately balancing physical properties of the molded article.

The method of adjusting the volume average particle diameter of the rubber dispersion include adjusting the type or amount of an emulsifier, the shear force applied during kneading, the temperature condition during kneading, and the type or amount of an acid-modified olefin polymer in the case where the acid-modified olefin polymer is used, during manufacturing of the ethylene-α-olefin copolymer rubber latex.

In the present disclosure, the volume average particle diameter of the rubber dispersion is a value measured by laser diffraction and scattering technique.

It is preferable that the weight average molecular weight (Mw) and the molecular weight distribution (Mw/Mn) represented by the ratio between the weight average molecular weight (Mw) and the number average molecular weight (Mn) of the ethylene-α-olefin copolymer rubber latex of the present embodiment fall within certain ranges, in view of the fluidity and the low-temperature impact resistance of the resin composition, and it is also important in view of control on the cross-linking structure of the ethylene-α-olefin copolymer rubber latex.

The weight average molecular weight (Mw) of the ethylene-α-olefin copolymer rubber latex is preferably $17 \times 10^4$ to $35 \times 10^4$, and more preferably $26 \times 10^4$ to $32 \times 10^4$.

The molecular weight distribution (Mw/Mn) represented by the ratio between the weight average molecular weight (Mw) and the number average molecular weight (Mn) of the ethylene-α-olefin copolymer rubber latex is preferably 1.0 to 3.0 and more preferably 1.9 to 2.5, in view of the fluidity and the low-temperature impact resistance of the resin composition.

In the present disclosure, the weight average molecular weight (Mw) and the number average molecular weight (Mn) of the ethylene-α-olefin copolymer rubber latex are determined by converting measurements of gel permeation chromatography (GPC) into values in terms of standard polystyrene.

——Ethylene-α-Olefin Copolymer——

The ethylene-α-olefin copolymer contained in the ethylene-α-olefin copolymer rubber latex of the present embodiment is a copolymer having an ethylene unit and an α-olefin unit, and is obtained by copolymerizing ethylene and an α-olefin with a well-known polymerization method.

The α-olefin has preferably a carbon number of 3 or more, and specific examples thereof include propylene, 1-butene, 1-pentene, 1-hexene, 1-heptene, 1-octene, 1-decene, 1-undecene, 1-icosene, and 1-docosene, in view of the low-temperature impact resistance of the composition. Of these, α-olefins having a carbon number of 3 to 20 are preferable, and propylene is particularly preferable.

The content percentage of an ethylene unit in an ethylene-α-olefin copolymer is preferably within a range from 30 to 85% by mass, is more preferably 30 to 80% by mass, and even more preferably 35 to 80% by mass when the all constitutional units constituting the ethylene-α-olefin copolymer is taken to be 100% by mass, in view of the low-temperature impact resistance of the composition.

The production method of the ethylene-α-olefin copolymer used in the present embodiment is not particularly limited. Generally, a polymerization method using a metallocene catalyst or a Ziegler-Natta catalyst can be used.

Examples of the metallocene catalyst include a catalyst containing a metallocene complex in which an organic compound having a cyclopentadienyl skeleton, a halogen atom, or the like is coordinated to a transition metal such as zirconium, titanium and hafnium, combined with an organic aluminum compound, an organic boron compound, or the like.

Examples of the Ziegler-Natta catalyst include a catalyst containing a halide of a transition metal such as titanium, vanadium, zirconium, and hafnium, combined with an organic aluminum compound, an organic boron compound, or the like.

The polymerization method of polymerizing to produce an ethylene-α-olefin copolymer is exemplified by a method in which ethylene and an α-olefin are copolymerized in a solution in the presence of the aforementioned catalyst. In this case, a hydrocarbon solvent such as benzene, toluene, xylene, pentane, hexane, heptane, and octane are generally used. These hydrocarbon solvents may be used alone or in a combination of two or more. The α-olefin as the raw material may be used as a solvent.

——Acid-Modified Olefin Polymer——

As described above, the ethylene-α-olefin copolymer rubber latex of the present embodiment may be a mixture of an ethylene-α-olefin copolymer and an acid-modified olefin polymer which is subjected to cross-linking, or a mixture of an ethylene-α-olefin copolymer that has been subjected to cross-linking alone and an acid-modified olefin polymer that has been subjected to cross-linking alone.

When the ethylene-α-olefin copolymer rubber latex is obtained by cross-linking the mixture of the ethylene-α-olefin copolymer and the acid-modified olefin polymer, an aromatic vinyl compound described below can be stably polymerized. Particularly, when the aromatic vinyl compound is polymerized by emulsion polymerization, the emulsion stability can be enhanced.

Examples of the acid-modified olefin polymer include a polymer in which an olefin polymer, such as an olefin polymer of polyethylene or polypropylene, having a weight average molecular weight of 1,000 to 5,000 is modified by a compound having an acid functional group such as an unsaturated carboxylic acid compound.

Examples of the unsaturated carboxylic acid compound include acrylic acid, maleic acid, itaconic acid, maleic anhydride, itaconic anhydride, and maleic acid monoamide.

The ratio of the acid-modified olefin polymer in the ethylene-α-olefin copolymer rubber latex is preferably 1 to 40 parts by mass and more preferably 1 to 35 parts by mass per 100 parts by mass of the ethylene-α-olefin copolymer. When the ratio of the acid-modified olefin polymer is within the range of from 1 to 40 parts by mass, the low-temperature impact resistance of the resin composition is further improved.

The timing to add the acid-modified olefin polymer is not particularly limited, and cross-linking may be carried out after mixing an ethylene-α-olefin copolymer and an acid-modified olefin polymer, or an ethylene-α-olefin copolymer that has been subjected to cross-linking alone and an acid-modified olefin polymer that has been subjected to cross-linking alone may be mixed.

The method of mixing the ethylene-α-olefin copolymer and the acid-modified olefin polymer is not particularly limited, as long as it is possible to achieve uniform dispersion. Yet, a melt-kneading method using a kneader, a Banbury mixer, a multi-screw extruder, or the like is preferable.

The content of the ethylene-α-olefin copolymer rubber latex in the (b) component is 30 to 70% by mass, is more preferably 30 to 65% by mass, and even more preferably 40 to 60% by mass. When the content of the ethylene-α-olefin copolymer rubber latex is 30 to 70% by mass, the low-temperature impact resistance, the tracking resistance, and the vibration fatigue resistance characteristic of the resin composition are further improved.

In addition, the content of the ethylene-α-olefin copolymer rubber in the (b) component is 12 to 40% by mass, more preferably 15 to 40% by mass, and even more preferably 20 to 40% by mass. When the content of the ethylene-α-olefin copolymer rubber is 12 to 40% by mass, the low-temperature impact resistance, the tracking resistance, and the vibration fatigue resistance characteristic of the resin composition are further improved.

—Production Method of Ethylene-α-Olefin Copolymer Rubber Latex—

The ethylene-α-olefin copolymer rubber latex can be obtained by cross-linking an ethylene-α-olefin copolymer. Specifically, an ethylene-α-olefin copolymer rubber latex is obtainable by a method in which an ethylene-α-olefin copolymer is cross-linked alone; a method in which a mixture of an ethylene-α-olefin copolymer and an acid-modified olefin polymer is cross-linked; a method in which an ethylene-α-olefin copolymer and an acid-modified olefin polymer are independently cross-linked, and are then mixed; or a method in which an olefin resin aqueous dispersion is prepared from an ethylene-α-olefin copolymer or a mixture of an ethylene-α-olefin copolymer and an acid-modified olefin polymer, and is then cross-linked.

In the method in which an olefin resin aqueous dispersion is prepared from an ethylene-α-olefin copolymer or a mixture of an ethylene-α-olefin copolymer and an acid-modified olefin polymer, and is then cross-linked, the method of preparing the olefin resin aqueous dispersion is not particularly limited. Yet, it is preferable, for example, to employ a method in which, using a well-known melt-kneading mean such as a kneader, a Banbury mixer, and a multi-screw extruder, an ethylene-α-olefin copolymer or a mixture of an ethylene-α-olefin copolymer and an acid-modified olefin polymer is melted and kneaded, then dispersed by applying mechanical shear force, and poured into an aqueous medium containing an emulsifier; or a method in which the ethylene-α-olefin copolymer or the mixture is dissolved together with an emulsifier in a hydrocarbon solvent such as pentane, hexane, heptane, benzene, toluene, and xylene, added to an aqueous medium to form an emulsion, and stirred sufficiently, and then the hydrocarbon solvent is removed by distillation.

The emulsifier used for preparation of the olefin resin aqueous dispersion may be a generally used emulsifier, and examples thereof include long-chain alkyl carboxylates, sulfosuccinate alkylester salts, and alkyl benzene sulfonates, for example.

As a method of cross-linking, a well-known cross-linking method can be employed, such as cross-linking using an organic peroxide, and cross-linking by ionizing radiation. Of these, in view of uniformity of the cross-linking structure of the ethylene-α-olefin copolymer rubber latex, cross-linking using an organic peroxide is preferable, and cross-linking an olefin resin aqueous dispersion using an organic peroxide is particularly preferable.

In cross-linking using an organic peroxide, the gel content ratio can be easily controlled by adjusting the amount of the organic peroxide, the heating temperature, the heating time, and the like.

Note that the volume average particle diameter of a rubber dispersion of an ethylene-α-olefin copolymer rubber latex obtained by cross-linking an olefin resin aqueous dispersion using an organic peroxide does not change from the volume average particle diameter of the olefin resin aqueous dispersion.

Examples of the organic peroxide that can be used for cross-linking include organic peroxides such as peroxy ester compounds, peroxy ketal compounds, and dialkyl peroxide compounds.

Specific examples of the peroxy ester compounds include α,α'-bis (neodecanoylperoxy)diisopropylbenzene, cumyl peroxy neodecanoate, 1,1,3,3-tetramethylbutyl peroxyneodecanoate, 1-cyclohexyl-1-methyl ethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis (2-ethylhexanoylperoxy)hexane, 1-cyclohexyl-1-methylethyl peroxy-2-ethyl hexanoate, t-hexyl peroxy-2-hexyl hexanoate, t-butyl peroxy-2-hexyl hexanoate, t-butyl peroxy isobutyrate, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis (m-toluoyl peroxy)hexane, t-butyl peroxy isopropyl monocarbonate, t-butyl peroxy 2-ethylhexyl monocarbonate, t-hexyl peroxybenzoate, 2,5-dimethyl-2,5-bis (benzoyl peroxy) hexane, t-butyl peroxy acetate, t-butyl peroxy-m-toluoyl benzoate, t-butyl peroxy benzoate, and bis (t-butyl peroxy) isophthalate.

Specific examples of the peroxy ketal compounds include 1,1-bis (t-hexylperoxy)-3,3,5-trimethylcyclohexane, 1,1-bis (t-hexylperoxy) cyclohexane, 1,1-bis(t-butylperoxy)-3,3,5-trimethylcyclohexane, 1,1-bis (t-butylperoxy) cyclohexane, 1,1-bis (t-butylperoxy)cyclododecane, 2,2-bis (t-butylperoxy)butane, n-butyl-4,4-bis(t-butylperoxy)valerate, 2,2-bis (4,4-di-(t-butylperoxy)cyclohexyl) propane.

Specific examples of the dialkyl peroxide compounds include α,α'-bis (t-butyl peroxy)diisopropyl benzene, dicumyl peroxide, 2,5-dimethyl-2,5-bis (t-butyl peroxy) hexane, t-butyl cumyl peroxide, and di-t-butyl peroxide, and 2,5-dimethyl-2,5-bis (t-butyl peroxy)hexyne-3.

These organic peroxides may be used alone or in a combination of two or more.

Of these organic peroxides, dialkyl peroxide compounds such as dicumyl peroxide, t-butyl cumyl peroxide, and di-t-butyl peroxide are particularly preferable in view of the uniformity of the cross-linking structure. The amount of t-butyl cumyl peroxide used is preferably within the range from 0.1 to 10 parts by mass per 100 parts by mass of the ethylene-α-olefin copolymer or 100 parts by mass of the sum of the ethylene-α-olefin copolymer and the acid-modified olefin polymer.

Further, upon cross-linking, a polyfunctional compound may be added in order to adjust the gel content of the ethylene-α-olefin copolymer rubber latex.

Examples of the polyfunctional compound include divinyl benzene, allyl methacrylate, ethylene glycol dimethacrylate, 1,3-butylene dimethacrylate, tetraethylene glycol diacrylate, triallyl cyanurate, triallyl isocyanurate, and pentaerythritol tetraacrylate.

These polyfunctional compounds may be used alone or in a combination of two or more.

Of these polyfunctional compounds, divinylbenzene is preferable. The amount of divinylbenzene used is preferably within the range from 0 to 10 parts by mass per 100 parts by mass of the ethylene-α-olefin copolymer or 100 parts by mass of the sum of the ethylene-α-olefin copolymer and the acid-modified olefin polymer.

—Aromatic Vinyl Compound—

Examples of the aromatic vinyl compound constituting the graft chain of the (b) component include, but are not particularly limited to, styrene, α-methyl styrene, vinyltoluene, o-ethylstyrene, and o- and p-dichlorostyrene.

These aromatic vinyl compounds may be used alone or in a combination of two or more.

Of these aromatic vinyl compounds, styrene and α-methyl styrene are preferable in view of the compatibility with the (a) component.

The number average molecular weight in terms of standard polystyrene of the aromatic vinyl compound polymer measured by gel permeation chromatography (GPC) is preferably 10,000 or more and 50,000 or less, more preferably 12,000 or more and 50,000 or less, and even more preferably 15,000 or more and 50,000 or less in view of enhancing the compatibility with the polyphenylene ether resin.

The content of the aromatic vinyl compound in the (b) component is determined as the graft ratio of the graft copolymer (b), and is 30 to 70% by mass, more preferably 35 to 65% by mass, and even more preferably 40 to 60% by mass, in view of the fluidity and the low-temperature impact resistance of the resin composition.

Note that the graft ratio of the graft copolymer (b) is measured with the following procedure.

After 1 g of a graft copolymer (b) is added to 80 mL of acetone and heated under reflux for 3 hours at a temperature within the range of 65 to 70° C., the obtained suspended acetone solution is centrifuged using a centrifugal machine at 14,000 rpm for 30 minutes, thereby fractionating a precipitated component (acetone-insoluble component) and an acetone solution (acetone-soluble component). Thereafter, the precipitated component (acetone-insoluble component) is dried and the weight Y (g) is measured, and then the graft ratio is calculated in accordance with the following equation (3). In the formula (3), Y represents the mass (g) of the acetone-insoluble component of the graft copolymer (b); X represents the total mass (g) of the graft copolymer (b) measured to calculate Y; and the rubber ratio represents the ratio of amount of the ethylene-α-olefin copolymer rubber latex in the graft copolymer (b) in terms of a solid content:

$$\text{Graft ratio(\% by mass)} = \{(Y-X) \times \text{rubber ratio})/X \times \text{rubber ratio}\} \times 100 \quad (3)$$

Alternatively, the graft ratio may be measured by using the nuclear magnetic resonance (NMR), infrared (IR) absorption, or specific gravity method.

—Production Method of Graft Copolymer (b)—

The graft copolymer (b) is obtained by polymerizing an aromatic vinyl compound in the presence of an ethylene-α-olefin copolymer rubber latex.

As a polymerization method, well-known polymerization methods such as emulsion polymerization, solution polymerization, suspension polymerization, and bulk polymerization can be employed, and the emulsion polymerization is particularly preferable in view of the low-temperature impact resistance of the composition.

Examples of the method of producing a graft copolymer (b) by emulsion polymerization include a method in which a vinyl monomer mixture is mixed with an organic peroxide, and is then continuously added to an ethylene-α-olefin copolymer rubber latex.

The organic peroxide is preferably used as a redox initiator in which an organic peroxide, a transition metal, and a reducing agent are combined.

In the polymerization, a chain transfer agent, an emulsifier, and the like may be used depending on the circumstance.

Further, an antioxidant may be added to the graft copolymer (b) if necessary.

The redox initiator is preferably a redox initiator in which an organic peroxide and a ferrous sulfate-chelating agent-reducing agent are combined.

Examples of the organic peroxide include cumene hydroperoxide, diisopropyl benzene hydroperoxide, and t-butyl hydroperoxide.

A redox initiator composed of cumene hydroperoxide, ferrous sulfate, sodium pyrophosphate, and dextrose is more preferred.

Examples of the chain transfer agent include mercaptans (e.g., octyl mercaptan, n- or t-dodecyl mercaptan, n-hexadecyl mercaptan, n- or t-tetradecyl mercaptan), allyl compounds such as allyl sulfonic acid, methallyl sulfonic acid, and sodium salts thereof, and α-methyl styrene dimer. Of these, mercaptans are preferable. These chain transfer agent may be used alone or in a combination of two or more.

The method of adding the chain transfer agent may be any of one-batch addition, two or more-batches addition, and continuous addition.

The amount of chain transfer agent added is preferably 2.0 parts by mass or less per 100 parts by mass of an aromatic vinyl compound.

Examples of the emulsifier include an anionic surfactant, a non-ionic surfactant, and an ampholytic surfactant.

Examples of the anionic surfactant include sulfuric esters of higher alcohols, alkyl benzene sulfonates, fatty acid sulfonates, phosphinates, fatty acid salts, and salts of amino acid derivatives.

Examples of the nonionic surfactant include typical polyethylene glycol alkyl ester-type surfactants, alkyl ether-type surfactants, and alkyl phenyl ether-type surfactants.

Examples of the amphoteric surfactant include surfactants having a carboxylate, sulfuric ester salt, sulfonate, or phosphoric acid ester salt as an anion part, and having an amine salt or quaternary ammonium salt as a cation part.

The amount of the emulsifier is preferably 10 parts by mass or less per 100 parts by mass of the aromatic vinyl compound.

The graft copolymer (b) obtained as described above is dispersed in water. As a method of isolating the graft copolymer (b) from an aqueous dispersion containing the graft copolymer (b), a precipitation method can be mentioned, in which a precipitation agent is added to the aqueous dispersion, the mixture is heated and stirred, and the precipitation agent is removed, and the residue is washed, dehydrated and dried.

As the precipitating agent in the precipitation method, aqueous solutions of sulfuric acid, acetic acid, calcium chloride, and magnesium sulfate can be mentioned. These precipitating agents may be used alone or in a combination of two or more.

((c) First Hydrogenated Block Copolymer)

Preferably, the resin composition of the present embodiment further contains a (c) first hydrogenated block copolymer.

Preferably, the (c) component is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, and the polymer block B1 in the (c) component has a glass transition temperature of −50° C. or lower.

In this specification, a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer may be simply referred to as a "hydrogenated block copolymer". In addition, a hydrogenated block copolymer that is not modified of hydrogenated block copolymers may also be referred to as an "unmodified hydrogenated block copolymer", and a modified product of a hydrogenated block copolymer may also be referred to as a "modified hydrogenated block copolymer".

Furthermore, 1,2-vinyl bonds and 3,4-vinyl bonds in a conjugated diene compound unit may also be referred to as "total vinyl bonds".

Preferably, the (c) component contains a (c-1) hydrogenated block copolymer and a (c-2) hydrogenated block copolymer ((c-1) component and (c-2) component) described below.

—(c-1) and (c-2) Hydrogenated Block Copolymers—

Each of the (c-1) and (c-2) hydrogenated block copolymers is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, wherein the molecular weight peak in terms of standard polystyrene measured by GPC of the (c-1) component is located at 80,000 to 200,000, and that of the (c-2) component is located at 10,000 or more and less than 80,000.

The molecular weight peaks satisfying these conditions improve the low-temperature impact resistance of the composition.

——Polymer Block A1——

Examples of the polymer block A1 composed primarily of a vinylarene compound include homopolymer blocks of vinylarene compounds, and copolymer blocks of vinylarene compounds and conjugated diene compounds. Of these, preferred are homopolymer blocks of vinylarene compounds, and copolymer blocks of vinylarene compounds and conjugated diene compounds containing more than 50% by mass (preferably 70% by mass or more) of the vinylarene compound units.

Here, the term "polymer block A1 'composed primarily of a vinylarene compound'" means that vinylarene compound units are contained in the polymer block A1 prior to hydrogenation in an amount of more than 50% by mass, and the vinylarene compound units are contained in an amount of preferably 70% by mass or more.

Examples of the vinylarene compounds include, but are not particularly limited to, styrene, α-methyl styrene, vinyl toluene, p-tert-butylstylene, and diphenylethylene. Of these, styrene is preferable.

Examples of the conjugated diene compound include conjugated diene compounds described below, and butadiene, isoprene, and a combination of these are preferable.

They may be used alone or in a combination of two or more.

In the polymer block A1, the distribution of vinylarene compounds, conjugated diene compounds, and the like, in the molecular chain of in the polymer block may be a random distribution, a tapered distribution (i.e., a distribution in which monomer portions increase or decrease along the molecular chain), a partial block distribution, or a combination of these distributions.

In the case in which the (c-1) component and/or (c-2) component include two or more block copolymers A1, these polymer blocks A1 may each have the same structure or may have different structures. Furthermore, the polymer block A1 in (c-1) component may be the same as or different from the polymer block A1 in (c-2) component.

The number average molecular weight (Mn) of the polymer block A1 is preferably 5,000 to 25,000 and more preferably 10,000 to 25,000 in view of achieving further excellent vibration fatigue resistance characteristic, chemical resistance, low-temperature impact resistance, and tracking resistance.

——Polymer Block B1——

Examples of the polymer block B1 composed primarily of a conjugated diene compound include homopolymer blocks of conjugated diene compounds, and random copolymer blocks of conjugated diene compounds and vinylarene compounds. Of these, preferred are homopolymer blocks of conjugated diene compounds, and copolymer blocks of conjugated diene compounds and vinylarene compounds containing more than 50% by mass (preferably 70% by mass or more) of the conjugated diene compound units.

Here, the term "polymer block B1 'composed primarily of a conjugated diene compound'" means that conjugated diene compound units are contained in the polymer block B1 in an amount of more than 50% by mass, and the conjugated diene compound units are contained in an amount of preferably 70% by mass or more.

Examples of the conjugated diene compounds include, but are not particularly limited to, butadiene, isoprene, 1,3-pentadiene, and 2,3-dimethyl-1,3-butadiene, for example. Of these, butadiene, isoprene, and a combination thereof are preferable.

Examples of the vinylarene compounds include the vinylarene compounds described above, and styrene is preferable.

They may be used alone or in a combination of two or more.

In the polymer block B1, the distribution of conjugated diene compounds, vinylarene compounds, and the like, in the molecular chain of in the polymer block may be a random distribution, a tapered distribution (i.e., a distribution in which monomer portions increase or decrease along the molecular chain), a partial block distribution, or a combination of these distributions.

In the case in which the (c-1) component and/or (c-2) component include two or more block copolymers B1, these polymer blocks B1 may each have the same structure or may have different structures. Furthermore, the polymer block B1 in (c-1) component may be the same as or different from the polymer block B1 in (c-2) component.

The hydrogenation ratio of ethylenic double bonds in the conjugated diene compound unit in the polymer block B1 is preferably 20% or more and less than 80% and more preferably 20% or more and less than 70%, in view of achieving further excellent vibration fatigue resistance characteristic, chemical resistance, low-temperature impact resistance, and tracking resistance. The hydrogenation ratio within such ranges is preferable because the impact resistance of the resin composition is improved.

The proportion of the sum of 1,2-vinyl bonds and 3,4-vinyl bonds relative to ethylenic double bonds in a conjugated diene compound unit in the polymer block B1 is preferably 25% or more and less than 60%, more preferably 25 to 55%, and even more preferably 25 to 50%, in view of achieving further excellent vibration fatigue resistance characteristic, chemical resistance, low-temperature impact resistance, and tracking resistance.

As used herein, the "sum of the 1,2-vinyl bonding amount and the 3,4-vinyl bonding amount (total vinyl bonding amount)" refers to the proportion of the sum of the 1,2-vinyl bonding amount and the 3,4-vinyl bonding amount in a conjugated diene compound unit in a polymer block containing a conjugated diene compound prior to hydrogenation, relative to the sum of the 1,2-vinyl bonding amount, the 3,4-vinyl bonding amount, and the 1,4-conjugated bonding amount. The total vinyl bonding amount can be determined through measurement using an infrared spectrophotometer and calculation in accordance with the method described in Analytical Chemistry, Volume 21, No. 8, August 1949.

The number average molecular weight (Mn) of the polymer block B1 is preferably 20,000 to 100,000, and more preferably 20,000 to 80,000 in view of achieving further excellent vibration fatigue resistance characteristic, chemical resistance, low-temperature impact resistance, and tracking resistance.

The glass transition temperature of the polymer block B1 after hydrogenation is −50° C. or lower, and preferably −60° C. or lower and more preferably −70° C. or lower in view of achieving further excellent vibration fatigue resistance characteristic, chemical resistance, low-temperature impact resistance, and tracking resistance.

Note that the glass transition temperature of a block copolymer and the glass transition temperature of polymer blocks in a block copolymer can be measured by a dynamic viscoelasticity measurement apparatus using a sample processed into a film, under the condition of the tension mode, a temperature scan speed of 3° C./minute, a frequency of 1 Hz, and a nitrogen atmosphere.

The polymer block B1 may be a single type of polymer block in which the proportion of the sum of 1,2-vinyl bonds and 3,4-vinyl bonds relative to ethylenic double bonds in a conjugated diene compound unit in the polymer block B1 is 25% or more and less than 60%. Or, the polymer block B1 may be a polymer block composed primarily of conjugated diene compounds, which has a polymer block B1-1 composed primarily of a conjugated diene compound having a proportion of the sum of 1,2-vinyl bonds and 3,4-vinyl bonds of 25 to 45%, and a polymer block B1-2 composed primarily of a conjugated diene compound having a proportion of the sum of 1,2-vinyl bonds and 3,4-vinyl bonds of 45% or more and less than 70%.

The structure of the block copolymer having the polymer block B1-1 and the polymer block B1-2 is represented by A-(B1-2)-(B1-1)-A, A-(B1-2)-(B1-1), for example, where "A", "B1-1", and "B1-2" represent the polymer block A1, the polymer block B1-1, and the polymer block B1-2, respectively, and can be made using a well-known polymerization method to control the total vinyl bonding amount based on adjusted feed sequences of respective monomer units.

——Structure of Hydrogenated Block Copolymer——

Examples of the structures of the hydrogenated block copolymers in the (c-1) and (c-2) components include structures such as A-B, A-B-A, B-A-B-A, $(A-B-)_n-X$ (where n is an integer of 1 or more, and X is a reaction residue of a polyfunctional coupling agent such as silicon tetrachloride and tin tetrachloride, or a residue of an initiator such as a polyfunctional organolithium compound), and A-B-A-B-A, where "A" represents the polymer block A1 and "B" represents the polymer block B1).

Furthermore, with regard to the block structure, preferably, the polymer block B1 is a homopolymer block of a conjugated diene compound, or a copolymer block of a conjugated diene compound and a vinylarene compound containing more than 50% by mass (preferably 70% by mass or more) of the conjugated diene compound unit, and the polymer block A1 is a homopolymer block of a conjugated diene compound, or a copolymer block of a vinylarene compound and a conjugated diene compound containing more than 50% by mass (preferably 70% by mass or more) of the vinylarene compound.

The (c-1) and (c-2) components may each include a block other than the polymer block A1 and the polymer block B1.

The molecular structure of the hydrogenated block copolymer in the (c-1) and (c-2) components may be linear, branched, radial, or combinations thereof, without being limited thereto.

——Content of Vinylarene Compound Unit——

The content of a vinylarene compound unit in the (c-1) and (c-2) components (hydrogenated block copolymer constitutional unit derived from a vinylarene compound) is, but not particularly limited to, preferably 10 to 70% by mass, more preferably 20 to 70% by mass, even more preferably 20 to 60% by mass, still even more preferably 30 to 50% by mass, and particularly preferably 30 to 40% by mass, in view of the heat resistance and the mechanical strength of the composition. In addition to the (c-1) and (c-2) components being the same having the content of the vinylarene compound unit within one of these ranges, the (c-1) and (c-2) components may have two or more different contents of vinylarene compound units.

——Total Vinyl Bonding Amount——

The proportion of the sum of 1,2-vinyl bonds and 3,4-vinyl bonds relative to ethylenic double bonds in a conjugated diene compound unit included in the (c-1) and (c-2) components is preferably 25% or more and less than 60%, more preferably 25% or more and 55% or less, and even more preferably 25% or more and 50% or less.

A proportion of the sum of 1,2-vinyl bonds and 3,4-vinyl bonds of less than 60% improves the impact resistance of the resin composition at low temperatures. The proportion of 50% or less further improves the impact resistance at low temperatures. Further, the proportion of the sum of 1,2-vinyl bonds and 3,4-vinyl bonds of 25% or more is preferable in view of an improved compatibility with the (e) component.

Examples of the method of controlling the proportion of the sum of 1,2-vinyl bonds and 3,4-vinyl bonds within such ranges include, but are not particularly limited to, adding an agent to adjust the 1,2-vinyl bonding amount and adjusting the polymerization temperature during manufacturing of the (c-1) and (c-2) components, for example.

The term "sum of 1,2-vinyl bonds and 3,4-vinyl bonds relative to double bonds in a conjugated diene compound unit" refers to the sum of 1,2-vinyl bonds and 3,4-vinyl bonds relative to double bonds (ethylenic double bonds) in a conjugated diene compound unit in a block copolymer prior to hydrogenation of the hydrogenated block copolymer. For example, the sum can be determined through measurement of a block copolymer prior to hydrogenation using an infrared spectrophotometer and calculation in accordance with the Hampton method. Alternatively, the sum can also be calculated from a block copolymer after hydrogenation by means of an NMR.

——Hydrogenation Ratio——

The hydrogenation ratio of ethylenic double bonds in the block copolymer (double bonds in the conjugated diene compound unit) in the (c-1) and (c-2) components is preferably more than 0% and less than 80%, more preferably 10% or more and less than 80%, even more preferably 20% or more and less than 80%, still even more preferably 20 to 70%, and particularly preferably 20% or more and less than 70%. The hydrogenation ratio within such ranges is preferable because of an improved impact resistance of the resin composition.

The (c-1) and (c-2) components having such hydrogenation ratios can be readily prepared by controlling the amount of hydrogen consumption within a range of a desired hydrogenation ratio (for example, 10% or more and less than 80%) in a hydrogenated reaction for ethylenic double bonds of a block copolymer, for example.

The hydrogenation ratio can be determined by quantifying the remaining double bonding amount in polymer block B1 by means of an NMR measurement, for example.

The (c-1) or (c-2) component having a proportion of the sum of 1,2-vinyl bonds and 3,4-vinyl bonds relative to ethylenic double bonds in a conjugated diene compound unit contained in the (c-1) or (c-2) component of less than 60%, and/or a hydrogenation ratio of ethylenic double bonds in the (c) component of less than 80% are more preferred because the impact resistance of the resin composition at low temperatures is improved.

——Molecular Weight Peak——

The molecular weight peak in terms of standard polystyrene of the (c-1) component after hydrogenation measured by GPC is 80,000 to 200,000, and is preferably 100,000 to 200,000 in view of the low-temperature impact resistance, the chemical resistance, the tracking resistance, and the vibration fatigue resistance characteristic. In addition, the molecular weight peak of the (c-2) component after hydrogenation in terms of the standard polystyrene measured by GPC is 10,000 or more and less than 80,000, and is preferably 30,000 or more and less than 80,000 in view of the low-temperature impact resistance, the chemical resistance, the tracking resistance, and the vibration fatigue resistance characteristic.

Examples of the method of controlling the molecular weight peaks of the (c-1) and (c-2) components within such ranges include, but are not particularly limited to, adjusting the amount of a catalyst in a polymerization step, for example.

In the present specification, the molecular weight peaks can be measured using the gel permeation chromatography apparatus System 21 manufactured by Showa Denko K.K. under the following conditions: (columns: one K-G, one K-800RL, and one K-800R, manufactured by Showa Denko K.K., connected in series; column temperature: 40° C.; solvent: chloroform; solvent flow rate: 1.0 mL/min; and sample concentration: 1 g/L chloroform solution of a hydrogenated block copolymer). A calibration curve is plotted using standard polystyrene (standard polystyrene having molecular weights of U.S. Pat. Nos. 3,650,000, 2,170,000, 1,090,000, 681,000, 204,000, 52,000, 30,200, 13,800, 3,360, 1,300, and 550). Measurements are carried out by setting the ultraviolet (UV) wavelength of a detector to 254 nm for both the standard polystyrene and hydrogenated block copolymer.

In the case where the (c-1) component has an A-B-A structure, the number average molecular weight (MnbA) of the polymer block A1 constituting the (c-1) component can be determined based on the number average molecular weight (Mnc) of the (c-1) component using the calculation formula: MncA=(Mnc×ratio of the amount of vinylarene compounds that are bound)/2, assuming that the molecular weight distribution of the (c-1) component is 1 and that two polymer blocks A1 composed primarily of a vinylarene compound have an identical molecular weight, for example. In the case where the sequences of the block structure A1 and the block structure B1 are known before a vinylarene compound-conjugated diene compound block copolymer is synthesized, the number average molecular weight may be calculated from the ratio of the block structure A based on the number average molecular weight (Mnb) of the (c-1) component that has been measured, without using the above calculation formula.

Each molecular weight distribution (Mw/Mn) of the (c-1) and (c-2) components prior to hydrogenation is preferably 1.01 to 1.50 and more preferably 1.03 to 1.40 in view of achieving further excellent vibration fatigue resistance characteristic, chemical resistance, low-temperature impact resistance, and tracking resistance.

——Production Method——

A method of producing the hydrogenated block copolymers in the (c-1) and (c-2) components is not particularly limited, and a well-known production method can be used. Examples include the methods disclosed in JPS4711486A, JPS4966743A, JPS5075651A, JPS54126255A, JPS5610542A, JPS5662847A, JPS56100840A, JPH02300218A, GB1130770A, U.S. Pat. Nos. 3,281,383A, 3,639,517A, GB1020720A, U.S. Pat. Nos. 3,333,024A, and 4,501,857A, for example.

—Modified Hydrogenated Block Copolymer—

The modified product of a hydrogenated block copolymer in the (c-1) and (c-2) components is exemplified by a modified hydrogenated block copolymer that is obtained by reacting a hydrogenated block copolymer (particularly, unmodified hydrogenated block copolymer) as described above and an α,β-unsaturated carboxylic acid or a derivative thereof (ester compounds and acid anhydride compounds), with or without a radical precursor, in molten state, solution state, or slurry state, at 80 to 350° C. In this case, the α,β-unsaturated carboxylic acid or the derivative thereof is preferably grafted or added to the unmodified hydrogenated block copolymer at a proportion of 0.01 to 10% by mass.

In the case in which an unmodified hydrogenated block copolymer and a modified hydrogenated block copolymer are used together as the (c-1) and/or (c-2) components, the mixing ratio of the unmodified hydrogenated block copolymer and the modified hydrogenated block copolymer can be set without any particular limitation.

——Ratio of (c-1) Component and (c-2) Component——

The ratio (c-1):(c-2), namely, the ratio of the component (c-1) having a molecular weight peak in terms of standard polystyrene measured by GPC of 80,000 to 200,000 and the component (c-2) having a molecular weight peak in terms of standard polystyrene measured by GPC of 10,000 or more and less than 80,000 is preferably 10:90 to 50:50 and more preferably 20:80 to 40:60, in view of achieving further excellent vibration fatigue resistance characteristic, chemical resistance, low-temperature impact resistance, and tracking resistance.

The ratio of the (c-1) component and the (c-2) component can be determined by calculating the ratio of the respective areas of the peaks obtained in GPC measurements similarly to measurements of molecular weight peaks described above.

Examples of the method of controlling the ratio of the (c-1) and (c-2) components within such ranges include, but are not particularly limited to, adjusting the amount of a coupling agent during coupling processing after polymerization, for example.

((d) Olefinic Polymer)

Preferably, the resin composition of the present embodiment further contains (d) an olefinic polymer constituted from an olefin excluding propylene.

Examples of the (d) component include, but are not particularly limited to, homopolymers of olefinic monomers excluding propylene, and copolymers of two or more monomers including an olefinic monomer excluding propylene, for example. Of these, a copolymer of ethylene and an α-olefin other than ethylene is preferable in view of the low-temperature impact resistance. Here, a propylene unit is excluded from a monomer unit constituting the (d) component in view of the low-temperature impact resistance, the chemical resistance, the tracking resistance, and the vibration fatigue resistance characteristic of a resultant resin composition.

Here, "olefinic polymer constituted from an olefin excluding propylene" and "a propylene unit is excluded" encompasses cases where propylene is included in an amount not hindering the effects of the present disclosure as a constitutional unit, and encompasses cases where the content of propylene unit in the (d) component in the all constitutional units constituting the (d) component is less than 0.1% by mass, for example.

Examples of the (d) component include copolymers of ethylene and one or two or more C4-C20 α-olefins, for example. Of these, the (d) component is more preferably a copolymer of ethylene and one or two or more C4-C8 α-olefins, even more preferably a copolymer of ethylene and one or two or more comonomers selected from the group consisting of 1-butene, 1-hexene, 4-methyl-1-pentene, and 1-octeneone, and particularly preferably a copolymer of ethylene and 1-butene. Such a copolymer used as the (b) component tends to provide a resin composition having a higher impact resistance and a higher chemical resistance.

The (d) component may be used alone or in a combination of two or more. In addition, two or more ethylene-α-olefin copolymers may be used as the (b) component.

The content of ethylene in the (d) component is preferably 5 to 95% by mass and more preferably 30 to 90% by mass relative to the total amount of the olefinic polymer, in view of the low-temperature curing resistance and the flexibility of the resin composition.

The content of α-olefins other than ethylene in the (d) component is not particularly limited. Yet, the content of α-olefin relative to the total amount of the olefinic polymer is preferably 5% by mass or more and more preferably 20% by mass or more in view of the low-temperature curing resistance and the flexibility of the resin composition; and is preferably 50% by mass or less and more preferably 48% by mass or less in view of the vibration fatigue resistance characteristic of the resin composition.

The brittleness temperature of the (d) component is −50° C. or lower, and is preferably −60° C. or lower and more preferably −70° C. or lower in view of achieving further excellent impact resistance and chemical resistance.

Brittleness temperatures can be measured in accordance with ASTM D746.

The density of the (d) component measured in accordance with JIS K7112 (density of the raw material before kneading) is preferably 0.87 g/cm$^3$ or more and more preferably 0.90 g/cm$^3$ or more in view of the chemical resistance of the resin composition.

Examples of the method of controlling the density of the (d) component within such ranges include, but are not particularly limited to, adjusting the density by controlling the ratio of content of ethylene units, for example.

The melt flow rate (MFR; density of the raw material before kneading, measured at 190° C. under a load of 2.16 kgf in accordance with ASTM D1238) of the (d) component is preferably 0.1 to 5.0 g/10 minutes and more preferably 0.3 to 4.0 g/10 minutes in view of stabilization of the morphology achieved by dispersion of the (b) component into the resin composition and the impact resistance of the resin composition.

Examples of the method of controlling the melt flow rate of the (d) component within such ranges include, but are not particularly limited to, adjusting the polymerization temperature and the polymerization pressure, and adjusting the molar ratio of the concentration of the monomer, such as ethylene and an α-olefin, and the concentration of hydrogen, in the polymerization system, during production of the (b) component, for example.

The (d) component may be an olefinic polymer rubber constituted from an olefin excluding propylene, for example.

The torsional rigidity of the (d) component is preferably 1 to 30 MPa and more preferably 1 to 25 MPa in view of providing a composition with a sufficient impact resistance. The torsional rigidity of the (d) component can be measured in accordance with ASTM D1043.

The Shore A hardness of the (d) component is preferably 40 to 110 and more preferably 50 to 100 in view of imparting a composition with a sufficient impact resistance. The Shore A hardness of the (b) component can be measured in accordance with JIS K6253.

Examples of the method of preparing the (d) component include, but are not particularly limited to, a method in which a catalyst (e.g., a catalyst based on titanium, metallocene, or vanadium) that can readily provide an α-olefin polymer having a high molecular weight under conventional process conditions. Of these, methods employing a metallocene catalyst and a titanium chloride catalyst are preferable in view of stability of structural controls. As a production method of an ethylene-α-olefin copolymer, well-known methods described in JPH6306121A and JPH7500622B and the like can be used.

((e) Second Hydrogenated Block Copolymer)

Preferably, the resin composition of the present embodiment further contains an (e) second hydrogenated block copolymer.

Preferably, the (e) component used in the present embodiment is a hydrogenated block copolymer in which at least a part of a block copolymer containing at least one polymer block A2 composed primarily of a vinylarene compound and at least one polymer block B2 composed primarily of a conjugated diene compound is hydrogenated, and/or a modified product of such a hydrogenated block copolymer, and the polymer block B2 in the (e) component has a glass transition temperature of higher than −50° C.

They may be used alone or in a combination of two or more.

Now, details of unmodified and modified hydrogenated block copolymers in the (e) component will be described.

——Polymer Block A2 Composed Primarily of Vinylarene Compound——

Examples of the polymer block A2 composed primarily of a vinylarene compound include, but are not particularly limited to, homopolymer blocks of vinylarene compounds, and copolymer blocks of vinylarene compounds and conjugated diene compounds.

Here, the term "polymer block A2 'composed primarily of a vinylarene compound'" means that vinylarene compound units are contained in the polymer block A2 prior to hydrogenation in an amount of more than 50% by mass, and the vinylarene compound units are contained in an amount of preferably 70% by mass or more, and more preferably 80% by mass or more, and the amount may be 100% by mass or less.

Examples of the vinylarene compound constituting the polymer block A2 include, but are not particularly limited to, styrene, α-methylstyrene, vinyltoluene, p-tert-butylstyrene, and diphenylethylene. Of these, styrene is preferable.

Examples of the conjugated diene compound constituting the polymer block A2 include butadiene, isoprene, 1,3-pentadiene, and 2,3-dimethyl-1,3-butadiene. Of these, butadiene, isoprene, and a combination thereof are preferable, and butadiene is more preferable.

They may be used alone or in a combination of two or more.

The number average molecular weight (Mn) of the polymer block A2 is preferably 15,000 or more, more preferably 20,000 or more, even more preferably 25,000 or more, and particularly preferably 100,000 or less, in view of improving the dispersibility thereof in a resin composition.

——Polymer Block B2 Composed Primarily of Conjugated Diene Compound——

Examples of the polymer block B2 composed primarily of a conjugated diene compound include, but are not particularly limited to, homopolymer blocks of conjugated diene compounds, and copolymer blocks of conjugated diene compounds and vinylarene compounds.

Here, the term "polymer block B2 'composed primarily of a conjugated diene compound'" means that conjugated diene compound units are contained in the polymer block B2 prior to hydrogenation in an amount of more than 50% by mass, and the conjugated diene compound units are contained in an amount of preferably 70% by mass or more, and more preferably 80% by mass or more in view of enhancing the fluidity of the resin composition, and the amount may be 100% by mass or less.

Examples of the conjugated diene compound constituting the polymer block B2 include, but are not particularly limited to, butadiene, isoprene, 1,3-pentadiene, and 2,3-dimethyl-1,3-butadiene. Of these, butadiene, isoprene, and a combination thereof are preferable, and butadiene is more preferable.

Examples of the vinylarene compound constituting the polymer block B2 include, but are not particularly limited to, styrene, α-methylstyrene, vinyltoluene, p-tert-butylstyrene, and diphenylethylene. Of these, styrene is preferable.

They may be used alone or in a combination of two or more.

The hydrogenation ratio of ethylenic double bonds in the conjugated diene compound unit included in the polymer block B2 is preferably 80% or more, and more preferably 90% or more, in view of achieving further excellent vibration fatigue resistance characteristic, chemical resistance, low-temperature impact resistance, and tracking resistance.

Here, the hydrogenation ratio may be measured by using a nuclear magnetic resonance (NMR) apparatus.

With regard to the microstructure of the polymer block B2 (bonding forms of the conjugated diene compound), the sum of the 1,2-vinyl bonding amount and the 3,4-vinyl bonding amount (total vinyl bonding amount) relative to ethylenic double bonds in a conjugated diene compound unit contained in the polymer block B2 is preferably 50% or more, more preferably more than 50%, even more preferably 55% or more, and particularly preferably 65% or more, in view of enhancing the compatibility to ethylene-α-olefin copolymer rubber parts in the (b) component in the polymer block B2 thereby improving the low-temperature impact resistance. Additionally, the sum is preferably 90% or less.

The number average molecular weight (Mn) of the polymer block B2 is preferably 30,000 to 100,000, and more preferably 40,000 to 100,000 in view of achieving further excellent vibration fatigue resistance characteristic, chemical resistance, low-temperature impact resistance, and tracking resistance.

The glass transition temperature of the polymer block B2 is preferably higher than −50° C., more preferably higher than −50° C. and 0° C. or lower, and even more preferably −40 to −10° C. in view of achieving further excellent vibration fatigue resistance characteristic, chemical resistance, low-temperature impact resistance, and tracking resistance.

Moreover, the distribution of the vinylarene compound in the molecular chain of the polymer block A2 and the distribution of the conjugated diene compound in the molecular chain of the polymer block B2 included in the block copolymer, as the (e) component, are not particularly limited, and may be a random distribution, a tapered distribution (i.e., a distribution in which monomer portions increase or decrease along the molecular chain), a partial block distribution, or a combination of these distributions, for example.

The block structure of the block copolymer of the modified and unmodified hydrogenated block copolymers as the (e) component is not particularly limited. For example, a structure such as A-B, A-B-A, B-A-B-A, (A-B-)$_4$M, or A-B-A-B-A, where "A" represents the polymer block A2 and "B" represents the polymer block B2, may be used as the (e) component. Note that (A-B-)$_4$M is a reaction residue of a polyfunctional coupling agent such as silicon tetrachloride (M=Si) or tin tetrachloride (M=Sn), a residue of an initiator such as a polyfunctional organolithium compound, or the like.

The (e) component may include a block other than the polymer block A2 and the polymer block B2.

The molecular structure of the block copolymer of the modified and unmodified hydrogenated block copolymers as the (e) component is not particularly limited, and may be linear, branched, radial, or combinations thereof, for example.

In a case in which the block copolymer as the (e) component includes a plurality of polymer blocks A2 or polymer blocks B2, these polymer blocks A2 or polymer blocks B2 may each have the same structure or may have different structures.

The content of the vinylarene compound unit in the (e) component is preferably 30% by mass or more and more preferably 32% by mass or more, and is preferably 50% by mass or less and more preferably 48% by mass or less, in view of improving the fluidity, the impact resistance, and the appearance of the (e) component, and reducing generation of welds.

The content of the vinylarene compound can be measured with an ultraviolet spectrophotometer.

The proportion of the sum of the 1,2-vinyl bonding amount and the 3,4-vinyl bonding amount relative to ethylenic double bonds in a conjugated diene compound unit included in the (e) component is preferably more than 50% and 90% or less, and more preferably 60 to 90%.

The hydrogenation ratio of ethylenic double bonds in the block copolymer (double bonds in a conjugated diene compound unit) in the (e) component is preferably 80 to 100% and more preferably 90 to 100%.

The number average molecular weight (Mn) of the block copolymer prior to hydrogenation in the (e) component is preferably 5,000 or more, more preferably 10,000 or more, and particularly preferably 30,000 or more; and is preferably 1,000,000 or less, more preferably 800,000 or less, and particularly preferably 500,000 or less.

The molecular weight distribution (Mw/Mn) of the block copolymer prior to hydrogenation in the (e) component is preferably 10 or less, more preferably 8 or less, and particularly preferably 5 or less.

The molecular weight distribution (Mw/Mn) can be calculated by determining the weight average molecular weight (Mw) by GPC (mobile phase: chloroform; and standard substance: polystyrene), and then dividing the weight average molecular weight (Mw) by the number average molecular weight (Mn).

Examples of the method of hydrogenating the block copolymer include, but are not particularly limited to, a method for hydrogenation at a reaction temperature of 0 to 200° C. and a hydrogen pressure of 0.1 to 15 MPa, by using: (1) a supported heterogeneous hydrogenation catalyst, obtained by carrying a metal such as Ni, Pt, Pd, and Ru on carbon, silica, alumina, and diatomaceous earth; (2) a so-called Ziegler-type hydrogenation catalyst using an organic acid salt of Ni, Co, Fe, Cr, and the like or a transition metal salt such as acetylacetonates and the like, and a reductant such as organic aluminum; and (3) a homogeneous hydrogenation catalyst such as a so-called organic metal complex of an organic metal compound of Ti, Ru, Rh, Zr, or the like.

Examples of the method of synthesizing the block copolymer comprising the polymer block A2 and the polymer block B2 include, but are not particularly limited to, well-known methods such as anionic polymerization.

A method of producing the modified and unmodified hydrogenated block copolymers is not particularly limited, and a well-known production method can be used. Examples thereof include the methods disclosed in JPS4711486A, JPS4966743A, JPS5075651A, JPS54126255A, JPS5610542A, JPS5662847A, JPS56100840A, JPH02300218A, GB1130770A, U.S. Pat. Nos. 3,281,383A, 3,639,517A, GB1020720A, U.S. Pat. Nos. 3,333,024A, and 4,501,857A, for example.

Now, details relating particularly to the modified hydrogenated block copolymer in the (e) component will be described.

—Modified Hydrogenated Block Copolymer—

The modified hydrogenated block copolymer is a product obtained through grafting or addition of an $\alpha,\beta$-unsaturated carboxylic acid or a derivative thereof (for example, an acid anhydride or an ester) to the unmodified hydrogenated block copolymer described above.

The ratio of mass increase resulting from the grafting or addition is not particularly limited, but is preferably 0.01% by mass or more, and is preferably 10% by mass or less, more preferably 7% by mass or less, and particularly preferably 5% by mass or less, per 100% by mass of the unmodified hydrogenated block copolymer.

The method of producing the modified hydrogenated block copolymer is not particularly limited, and may be a method in which the unmodified hydrogenated block copolymer and an $\alpha,\beta$-unsaturated carboxylic acid or derivative thereof are caused to react in a molten state, solution state, or slurry state under the condition of 80° C. to 350° C. in the presence or absence of a radical precursor, for example.

(Flame Retardant)

The resin composition of the present embodiment may further comprise a flame retardant for improving the flame retardancy. Among flame retardants, (f) a phosphate ester compound and (g) a phosphinate, described below, are preferably included.

—(f) Phosphate Ester Compound—

The (f) phosphate ester compound that may optionally be used in the present embodiment is not particularly limited, and any phosphate ester compounds (e.g., phosphate ester compound and condensed phosphate ester compounds) that have effects of improving the flame retardancy of the resin composition can be used. Examples include triphenyl phosphate, phenyl bisdodecyl phosphate, phenyl bisneopentyl phosphate, phenyl-bis(3,5,5'-trimethyl-hexyl phosphate), ethyl diphenyl phosphate, 2-ethyl-hexyl di(p-tolyl)phosphate, bis(2-ethylhexyl)-p-tolyl phosphate, tritolyl phosphate, bis(2-ethylhexyl)phenyl phosphate, tri(nonylphenyl) phosphate, di(dodecyl)-p-tolyl phosphate, tricresyl phosphate, dibutylphenyl phosphate, 2-chloro-ethyl diphenyl phosphate, p-tolyl bis (2,5,5'-trimethylhexyl)phosphate, 2-ethylhexyl diphenyl phosphate, bisphenol A bis(diphenyl phosphate), diphenyl-(3-hydroxyphenyl)phosphate, bisphenol A bis(dicresyl phosphate), resorcinol bis(diphenyl phosphate), resorcinol bis(dixylenyl phosphate), 2-naphthyl diphenyl phosphate, 1-napthyl diphenyl phosphate, and di(2-naphthyl)phenyl phosphate.

In particular, it is preferable that the (f) phosphate ester compound has, as a main component, at least one selected from the group consisting of aromatic condensed phosphate ester compounds represented by the following formula (4)

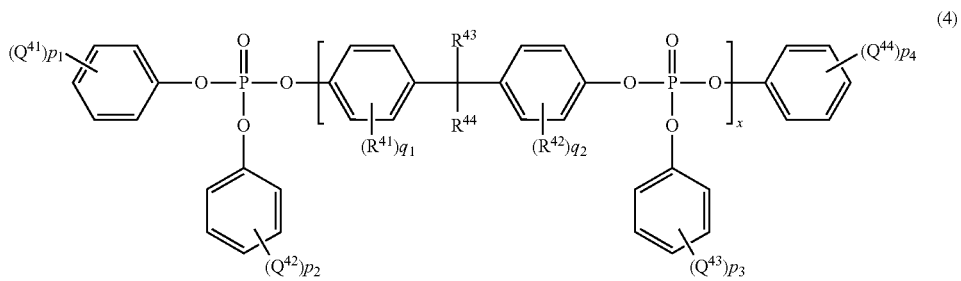

(4)

[in formula (4), $Q^{41}$, $Q^{42}$, $Q^{43}$, and $Q^{44}$ are each independently an alkyl group having a carbon atom number of 1 to 6; $R^{41}$ and $R^{42}$ are each independently a methyl group; $R^{43}$ and $R^{44}$ are each independently a hydrogen atom or a methyl group; x is an integer of 0 or more; $p_1$, $p_2$, $p_3$, and $p_4$ are each an integer of 0 to 3; and $q_1$ and $q_2$ are each an integer of 0 to 2], and the following formula (5)

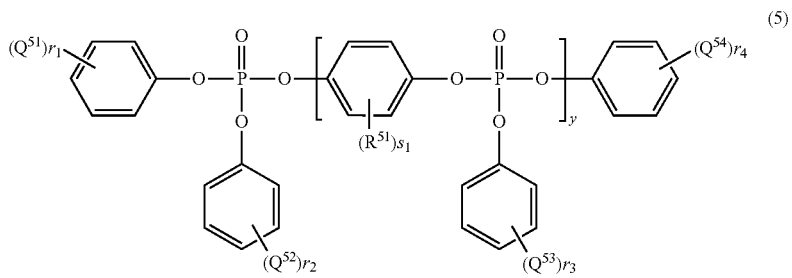

(5)

[in formula (5), $Q^{51}$, $Q^{52}$, $Q^{53}$, and $Q^{54}$ are each independently an alkyl group having a carbon atom number of 1 to 6; $R^{51}$ is a methyl group; y is an integer of 0 or more; $r_1$, $r_2$, $r_3$, and $r_4$ are each an integer of 0 to 3; and $s_1$ is an integer of 0 to 2].

Note that the condensed phosphate ester compounds represented by formula (4) and formula (5) may each include a plurality of types of molecules, and n is preferably an integer of 1 to 3 for each of the molecules.

In a suitable (d) phosphate ester compound having at least one selected from the group consisting of condensed phosphate ester compounds represented by formula (4) and formula (5) as a main component, overall, the average value of x and y is preferably 1 or more. This suitable (d) phosphate ester compound can usually be acquired as a mixture containing 90% or more of compounds having x and y of 1 to 3, as well as polymeric products having x and y of 4 or more and other by-products, besides the compounds having x and y of 1 to 3.

—(g) Phosphinate—

In the present embodiment, (g) a phosphinate may optionally be used. The (g) phosphinate may be, for example, at least one selected from the group consisting of:

a phosphinate represented by the following formula (6)

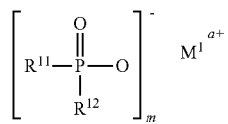

(6)

[in formula (6), $R^{11}$ and $R^{12}$ are each independently a linear or branched alkyl group having a carbon atom number of 1 to 6 and/or an aryl group having a carbon atom number of 6 to 10; $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a=m], and a diphosphinate represented by the following formula (7)

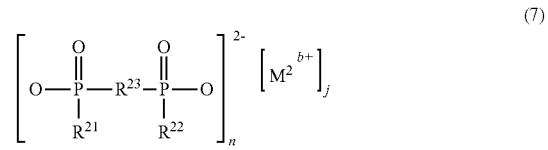

(7)

[in formula (7), $R^{21}$ and $R^{22}$ are each independently a linear or branched alkyl group having a carbon atom number of 1 to 6 and/or an aryl group having a carbon atom number of 6 to 10, $R^{23}$ is a linear or branched alkylene group having a carbon atom number of 1 to 10, an arylene group having a carbon atom number of 6 to 10, an alkylarylene group having a carbon atom number of 6 to 10, or an arylalkylene group having a carbon atom number of 6 to 10, $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base, b is an integer of 1 to 3, n is an integer of 1 to 3, j is an integer of 1 or 2, and b·j=2n].

Moreover, the (g) phosphinate may be a mixture of a phosphinate represented by formula (6) and a diphosphinate represented by formula (7).

Examples of such a (g) phosphinate include, but are not particularly limited to, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methane di(methylphosphinate), magnesium methane di(methylphosphinate), aluminum methane di(methylphosphinate), zinc methane di(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. The (g) phosphinate is preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, or zinc diethylphosphinate, and more preferably aluminum diethylphosphinate.

Examples of commercially available products that can be used as the (g) phosphinate include, but are not particularly limited to, Exolit® (Exolit is a registered trademark in Japan, other countries, or both) OP1230, OP1240, OP1311, OP1312, OP930, and OP935 manufactured by Clariant (Japan) K.K.

((h) Thermoplastic Resin)

Examples of a thermoplastic resin (h) other than the (a) to (e) components used optionally in the present embodiment include, but are not particularly limited to, polystyrene, syndiotactic polystyrene, and high impact polystyrene.

((i) Other Additives)

Examples of additives (i) other than the (a) to (h) components that may optionally be used in the present embodiment include, but are not particularly limited to, vinylarene compound-conjugated diene compound block copolymers other than the (c) and (e) components, olefin elastomers (excluding the (d) component), antioxidants, metal deactivators, heat stabilizers, flame retardants other than the (f) and (g) components (for example, ammonium polyphosphate compounds, magnesium hydroxide, aromatic halogen-containing flame retardants, silicone flame retardants, and zinc borate), fluorine-containing polymers, plasticizers (for example, low molecular weight polyethylene, epoxidized soybean oil, polyethylene glycol, and esters of fatty acids), flame retardant synergists such as antimony trioxide, weather (light) resistance modifiers, nucleating agents for polyolefins, slip agents, various colorants, and mold release agents.

Now, the proportions of components in the resin composition of the present embodiment will be described.

With regard to the content of each component in the resin composition of the present embodiment, preferably, the content of the (a) component is 50 to 99 parts by mass and the content of the (b) component is 1 to 50 parts by mass, and more preferably, the content of the (a) component is 60 to 80 parts by mass and the content of the (b) component is 1 to 20 parts by mass, per 100 parts by mass of the total amount of the (a) and (b) components, in view of enhancing the low-temperature impact resistance, the chemical resistance, the dielectric breakdown strength, and the vibration fatigue resistance characteristic of the resin composition.

Additionally, each content of the (c) and (d) components is preferably independently 1 to 30 parts by mass and more preferably 2 to 25 parts by mass per 100 parts by mass of the total amount of the (a) and (b) components, in view of the chemical resistance and the dielectric breakdown strength of the composition.

The content of the (e) component is preferably 1 to 30 parts by mass and more preferably 2 to 25 parts by mass per 100 parts by mass of the total amount of the (a) and (b) components in view of the vibration fatigue resistance characteristic of the composition.

Furthermore, the content of the (f) phosphate ester compound is preferably 5 to 30 parts by mass per 100 parts by mass of the total amount of the (a) and (b) components in view of balancing the mechanical characteristics of the composition.

Furthermore, the content of the (g) phosphinate is preferably 3 to 30 parts by mass per 100 parts by mass of the total amount of the (a) and (b) components in view of balancing the mechanical characteristics and flame retardancy of the resin composition.

Each content of the (h) and (i) components in the resin composition of the present embodiment may be, but is not particularly limited to, independently 0 to 400 parts by mass per 100 parts by mass of the total amount of the (a) and (b) components, for example, as long as not impairing the effects of the present disclosure.

(Morphology)

With regard to the morphology of the resin composition of the present embodiment, the (a) component has a continuous phase in view of the mechanical strength and chemical resistance.

In the present disclosure, the morphology of the resin composition can be observed by the method described in the EXAMPLES section below, and can be observed under a transmission electron microscope (TEM), for example.

The morphology of the resin composition can be controlled by adjusting the amount of the (a) component relative to the total amount of the composition or by suitably selecting the type of the (e) component, for example.

In addition, it is preferable that the resin composition of the present embodiment forms a morphology having the above-described continuous phase and domains containing the (b) component (discontinuous phases), and the average particle diameter of the domains is 0.3 to 2.0 µm.

The average particle diameter of the domains containing the (b) component is more preferably 0.5 to 2.0 µm and even more preferably 0.7 to 1.5 µm in view of enhancing impact resistance of the resin composition.

The method of controlling the average particle diameter of the domains containing the (b) component to 0.3 to 2.0 µm is exemplified by a method by feeding the (b) component from a side feed, for example. It is considered that feeding the (b) component from the side feed can prevent fine dispersion of the (b) component due to thermal degradation with an increase in the residence time inside an extruder.

Here, FIG. 1 is an image under a TEM (magnification: ×2,500) of a resin composition containing the (a) component and the (b) component, wherein a continuous phase containing the (a) component and oval domains containing the (b) component are formed.

In the present disclosure, the average particle diameter of the domains containing the (b) component can be measured by the following method, and in particular, it can be measured by the method described in the EXAMPLES section below, for example.

Initially, an area (pixel number corresponding to a 20-μm square) to be binarized is selected from a morphology image (magnification: ×2,500) obtained under the TEM as described above. The selected image is smoothed and is then binarized using image processing software.

Figure 5A:
FIG. 5A is an image observed under the TEM (magnification: ×2,500) of one example of a resin composition of the present embodiment containing the (a) to (e) components, where a continuous phase containing the (a) component, oval domains containing the (b) component, and linear domains containing the (c) to (e) components are formed.
Figure 5B:
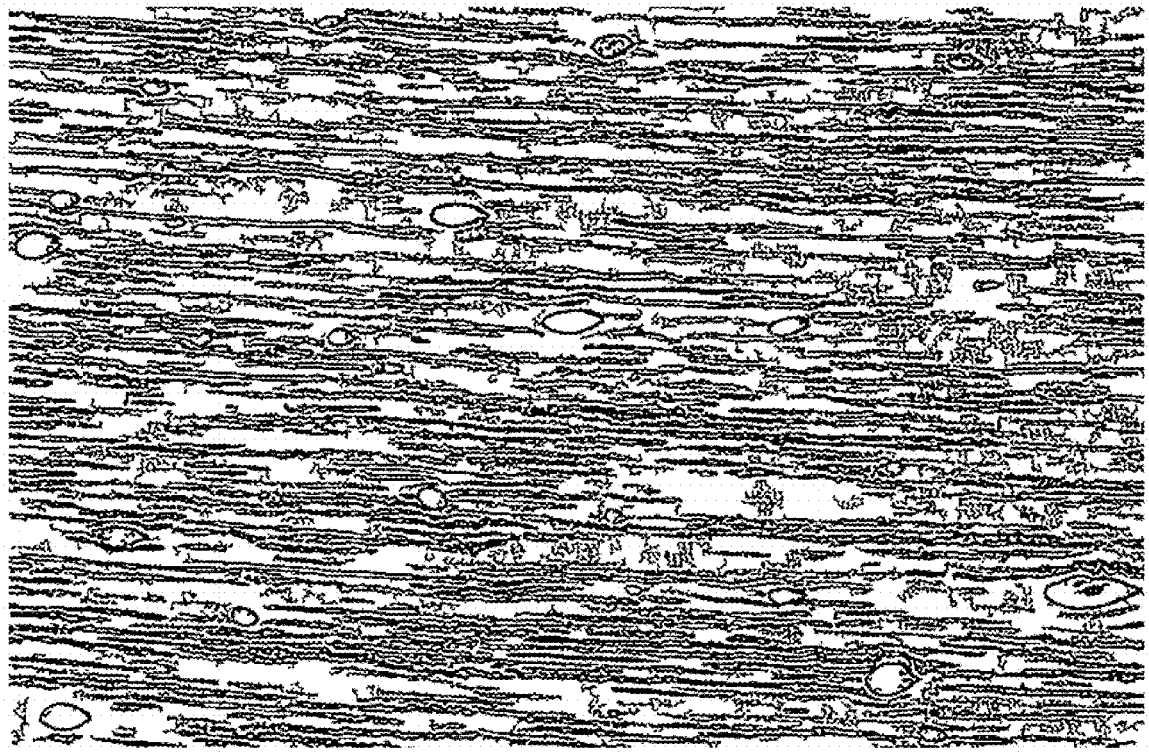
FIG. 5B is a binarized image of the image of FIG. 5A.

Here, FIG. 5B is a binarized image of the TEM image in FIG. 5A, for example.

Of closed areas that are turned black in the binarized image, 100 granular regions having shortest diameters of 150 nm or more are selected as domains containing the (b) component. The longest diameter (μm) and the shortest diameter (μm) of each selected domain are measured. For each particle, a particle diameter (μm) is determined by calculating the average of the longest and shortest diameters. An average particle diameter is determined by averaging the particle diameters of the 100 selected particles.

Furthermore, in the case where the resin composition of the present embodiment contains the (a), (b), (c), and (e) components, it is preferable that the (a) component forms a continuous phase and domains containing the (b) component and domains containing the (c) and (e) components are formed in that continuous phase.

Figure 2:
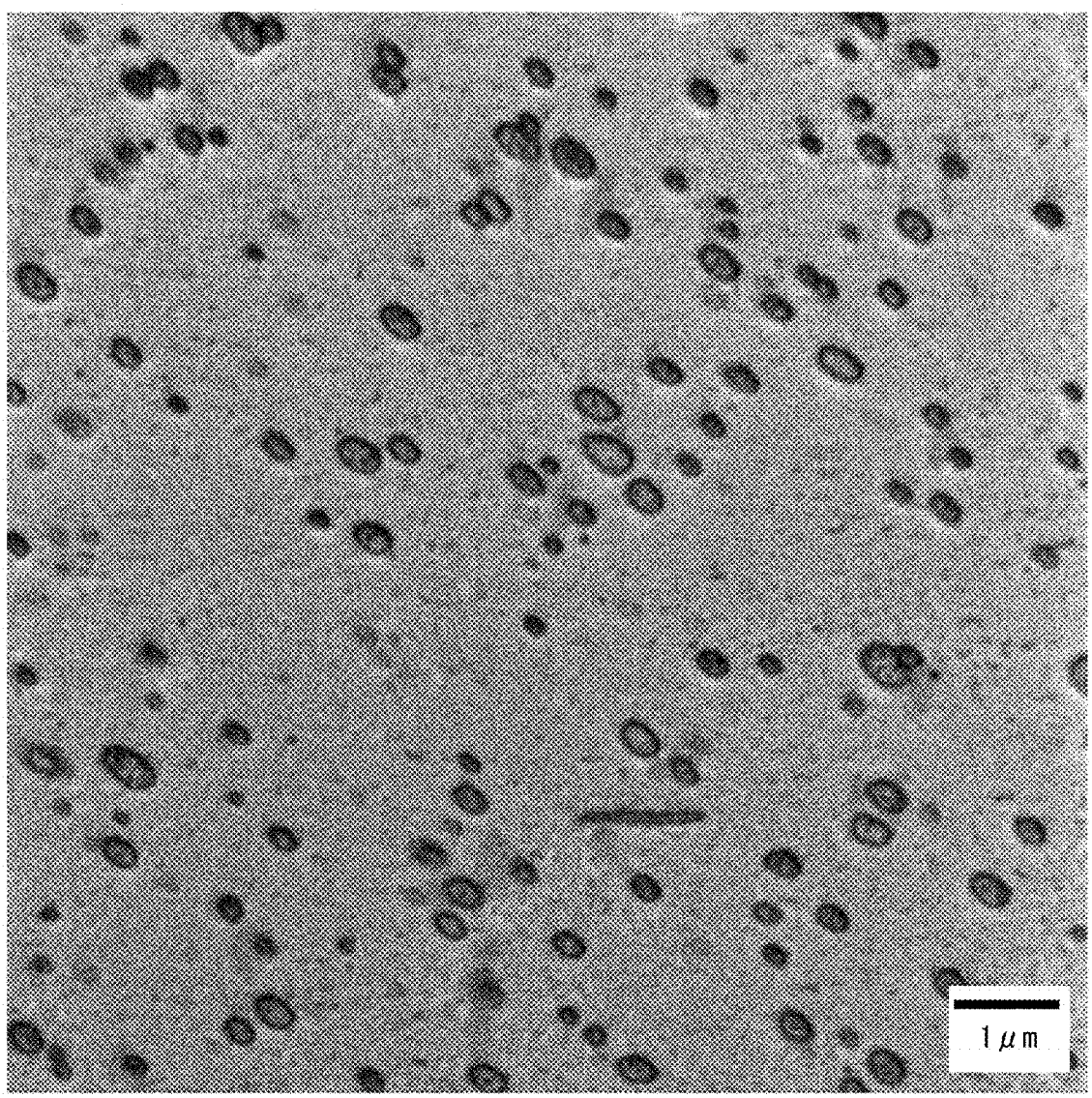
FIG. 2 is an image observed under the TEM (magnification: ×2,500) of one example of a resin composition of the present embodiment containing (a), (b), (c), and (e) components, where a continuous phase containing the (a) component, oval domains containing the (b) component, and worm-like and small-spherical domains containing the (c) and (e) components are formed.

FIG. 2 is an image under the TEM (magnification: ×2,500) of a resin composition containing (a), (b), (c), and (e) components, where a continuous phase containing the (a) component, oval domains containing the (b) component, and worm-like and small-spherical domains containing the (c) and (e) components are formed. It is considered that these worm-like and small-spherical domains have structures where the (c) component is surrounded by the (e) component (the (e) component forms surface layers).

Note that a worm-like domain is also generally referred to as a "worm-like shape", and the term "forming worm-like domains" is used to refer to a worm-like elongate structure, meaning that the domain is formed in a bent or branched structure. The term "worm-like" as used in the present embodiment may also mean that the domain may have a bent or arc structure, or may be forked into two or more branches or have sequential connections.

Alternatively, in the case where the resin composition of the present embodiment contains the (a), (b), and (d) components, it is preferable that the (a) component forms a continuous phase, and domains containing the (b) component and domains containing the (d) component are formed in that continuous phase.

Figure 3:
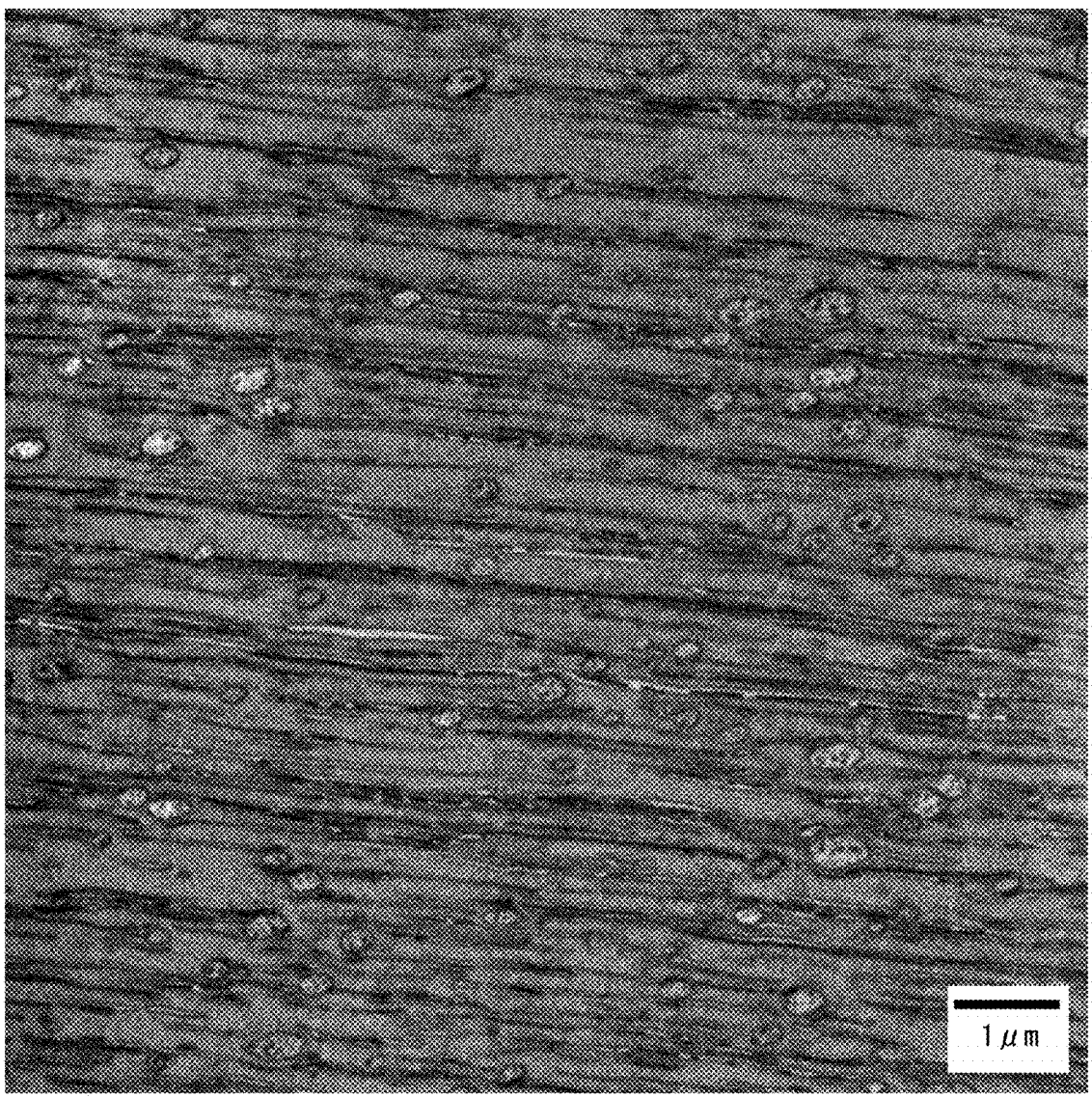
FIG. 3 is an image observed under the TEM (magnification: ×2,500) of one example of a resin composition of the present embodiment containing the (a), (b), and (d) components, where a continuous phase containing the (a) component, oval domains containing the (b) component, and amoeba-like domains containing the (d) component are formed.

FIG. 3 is an image under the TEM (magnification: ×2,500) of a resin composition containing the (a), (b), and (d) components, where a continuous phase containing the (a) component, oval domains containing the (b) component, and amoeba-like domains containing the (d) component are formed.

Here, the term "form amoeba-like domains" refers to domains having indefinite forms like amoebas.

Alternatively, in the case where the resin composition of the present embodiment contains the (a), (b), (d), and (e) components, it is preferable that the (a) component forms a continuous phase, and domains containing the (b) component and domains containing the (d) and (e) components are formed in that continuous phase.

Figure 4:
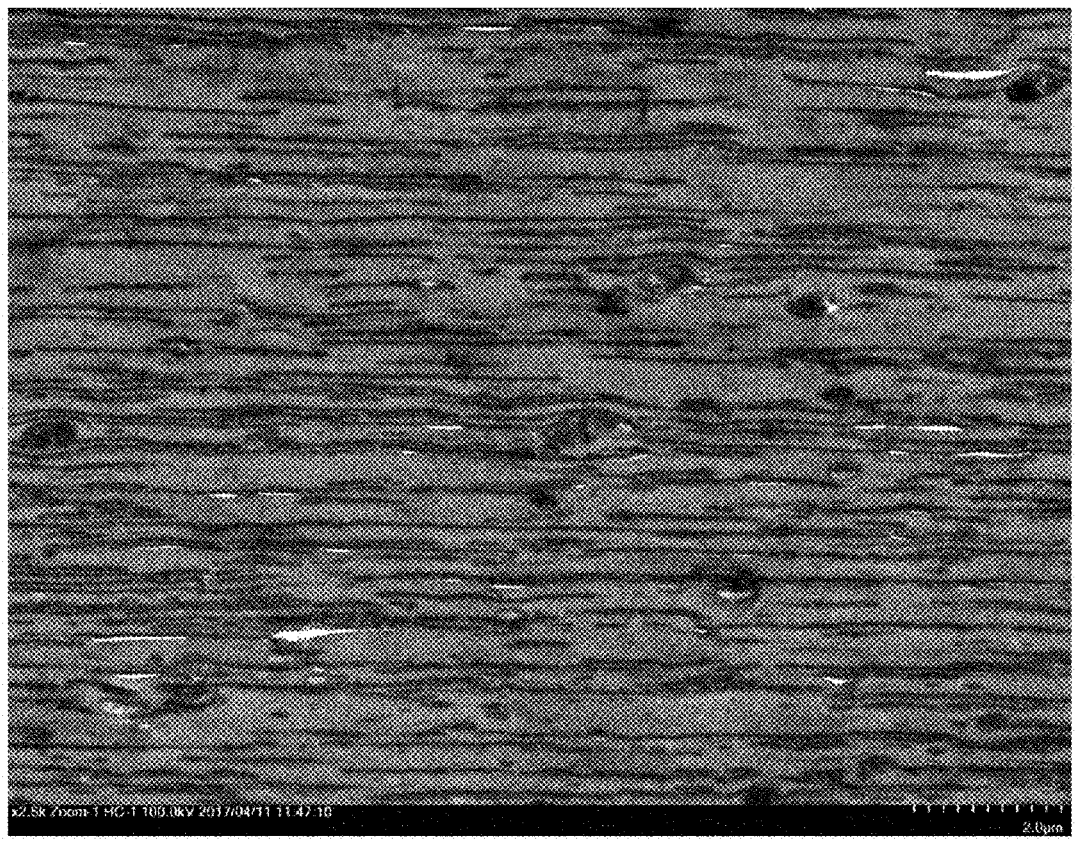
FIG. 4 is an image observed under the TEM (magnification: ×2,500) of one example of a resin composition of the present embodiment containing the (a), (b), (d), and (e) components, where a continuous phase containing the (a) component, oval domains containing the (b) component, and linear domains containing the (d) and (e) components are formed.

FIG. 4 is an image under the TEM (magnification: ×2,500) of a resin composition containing the (a), (b), (d), and (e) components, where a continuous phase containing the (a) component, oval domains containing the (b) component, and linear domains containing the (d) and (e) components are formed. It is considered that these linear domains have structures where the (d) component is surrounded by the (e) component (the (e) component forms surface layers). It can be observed that the addition of the (e) component modifies the (d) component into further thinner linear domains, as compared to the image of FIG. 3.

Alternatively, in the case where the resin composition of the present embodiment contains the (a) to (e) components, it is preferable that the (a) component forms a continuous phase, and domains containing the (b) component and domains containing the (c) to (e) components are formed in that continuous phase.

FIG. 5A is an image under the TEM (magnification: ×2,500) of a resin composition containing the (a) to (e) components, and FIG. 5B is a binarized image of the TEM image in FIG. 5A. FIGS. 5A and 5B depict that a continuous phase containing the (a) component, oval domains containing the (b) component, linear domains containing the (c) to (e) components are formed. It is considered that these linear domains (length: about 5 μm) have structures where the (c) component is surrounded by the (d) component, which is further surrounded by the (e) component (the (e) component forms surface layers, the (d) component forms intermediate layers, and the (c) component forms layers of cores).

In the present embodiment, the term "linear" may be used to refer to domains forked into two or more branches or having daisy chain connections.

(Production Method of Resin Composition)

The resin composition of the present embodiment can be produced by melt-kneading the above-described (a) and (b) components, and optionally (c), (d), (e), (f), (g), and (h) components.

A preferred method of producing the resin composition of the present embodiment is a production method comprising the following steps (1-1) and (1-2):

(1-1) melt-kneading the (a) component and optionally the (e) component to obtain a kneaded product; and (1-2) adding the (b) component and optionally the (c) component and/or (d) component to the kneaded product obtained in the step (1-1), followed by further melt-kneading.

In the step (1-1), all of the (a) component may be added or a part of the (a) component may be added. In addition, all or a part of the (e) component may be added. Particularly, the step (1-1) is preferably a step of melt-kneading all of the (a) component and optionally all or a part of the (e) component to obtain a kneaded product.

In the step (1-2), all or a part of the (b) component may be added. The step (1-2) is preferably a step of adding all of the (b) component to the kneaded product obtained in the step (1-1), followed by further melt-kneading.

Addition of the (b) component in the step (1-2) (particularly, addition of all of the (b) component in the step (1-2)) during melt-kneading as in this production method facilitates the (b) component to be efficiently dispersed in the (a) component, thereby imparting the resin composition with further excellent low-temperature impact resistance and chemical resistance.

In terms of the position of the feed inlet for feeding the (b) component, a ratio L1/L of the length L1 from the raw material feed inlet that is the most upstream in the direction of raw material flow to the position to add the (b) component, relative to the total barrel effective length L of a melt-kneading machine, is preferably 0.2 to 0.75 since this enables the dispersion state of the (b) component to be controlled within a specific range. The value of L1/L is more preferably 0.25 to 0.7, and even more preferably 0.3 to 0.6.

Examples of melt-kneading machines that can be suitably used for melt-kneading the components in the production method of the resin composition of the present embodiment include, but are not particularly limited to, heated melt-kneading machines such as an extruder (e.g., a single screw extruder and a multiscrew extruder such as a twin screw extruder), a roller, a kneader, a Brabender plastograph, and a Banbury mixer. In particular, a twin screw extruder is preferable in view of kneading performance. Specific examples of twin screw extruders include the ZSK series manufactured by Coperion Inc., the TEM series manufactured by Toshiba Machine Co., Ltd., and the TEX series manufactured by the Japan Steel Works, Ltd.

The type and standard of the extruder may be well-known ones without being limited.

Now, a preferred embodiment using a single screw extruder, or a multi screw extruder such as twin screw extruder, will be described.

The L/D (effective barrel length/barrel internal diameter) of the extruder is preferably 20 or more, more preferably 30 or more, and preferably 75 or less, more preferably 60 or less.

The extruder may be configured to include, but is not particularly limited to, in the direction of raw material flow, a first raw material feed inlet located on an upstream side, a first vacuum vent located downstream to the first raw material feed inlet, a second raw material feed inlet located downstream to the first vacuum vent, a first liquid feed pump located downstream to the second raw material feed inlet, and a second vacuum vent located downstream to the first liquid feed pump.

The method of feeding a raw material at the second raw material feed inlet is not particularly limited and may be a method in which the raw material is simply added from an opening in an upper part of the raw material feed inlet or a method in which the raw material is added from a side opening using a forced side feeder. In particular, a method in which the raw material is added from a side opening using a forced side feeder is preferable in view of stable feeding.

The melt-kneading temperature for melt-kneading each component may be, but is not particularly limited to, 200 to 370° C. The screw rotation number may be, but is not particularly limited to, 100 to 1200 rpm.

In the case of adding a raw material in a liquid state, the liquid raw material may be added by feeding it directly into the cylinder system by using a liquid feed pump, and the like, in the cylinder portion of the extruder. Examples of the liquid feed pump include, but are not particularly limited to, a gear pump and a flange pump, of which a gear pump is preferable. In this case, in view of reducing the load to the liquid feed pump and improving the workability of the material, it is preferable to lower the viscosity of the liquid material, by heating with a heater, etc., the tank for storing the liquid material, and the portion functioning as a flow path of the liquid material, such as the piping between the tank and the liquid feed pump, the piping between the pump and the extruder cylinder, and the like.

[Molded Article]

A molded article of the present embodiment is formed from the resin composition of the present embodiment set forth above.

Examples of the molded article of the present embodiment include, but are not particularly limited to, automotive components, interior and exterior components of electrical apparatuses, and other components. Examples of the automotive components include, but are not particularly limited to, exterior components such as bumpers, fenders, door panels, various moldings, emblems, engine hoods, wheel caps, roofs, spoilers, and various aero parts; interior components such as instrument panels, console boxes, and trims; battery case components for secondary batteries installed in vehicles, electric vehicles, hybrid electric vehicles, and the like; and lithium ion secondary battery components. Examples of the interior and exterior components of electrical apparatuses include, but are not particularly limited to, components used in various computers and peripheral devices thereof, junction boxes, various connectors, cabinets for other office automation apparatuses, television sets, video recorders, various disc players, chassis, refrigerators, air conditioners, liquid-crystal projectors. Examples of the other components include wires and cables obtained by applying a coating on a metal conductor or optical fiber, fuel casings for solid methanol batteries, water pipes for fuel cells, water cooling tanks, boiler exterior casings, ink peripheral parts and members for inkjet printers, furniture (chairs, etc.), chassis, water piping, and joints.

(Production Method of Molded Article)

The molded article of the present embodiment can be produced by molding the above-described resin composition of the present embodiment.

Examples of the method of producing the molded article of the present embodiment include, but are not particularly limited to, injection molding, extrusion molding, profile extrusion molding, blow molding, and compression molding, and injection molding is preferable in view of obtaining the effects of the present disclosure more effectively.

EXAMPLES

Embodiments for embodying the present disclosure will be described with reference to Examples, but the present disclosure is not limited to these examples.

Raw materials used for resin compositions and molded articles in Examples and Comparative examples were as follows.

—(a) Polyphenylene Ether Resin (a-i): Polyphenylene ether obtained through oxidative polymerization of 2,6-xylenol and having a reduced viscosity (chloroform solution with $\eta_{sp}/c$: 0.5 g/dL) of 0.51 dL/g (a-ii): Polyphenylene ether obtained through oxidative polymerization of 2,6-xylenol and having a reduced viscosity (chloroform solution with $\eta_{sp}/c$: 0.5 g/dL) of 0.42 dL/g Note that the reduced viscosity was measured with an Ubbelohde viscosity tube by using a chloroform solution with $\eta_{sp}/c$ of 0.5 g/dL under the condition of a temperature of 30° C.

—(b) Graft Copolymer—

(b-i) A graft copolymer in which a polystyrene with a number average molecular weight of 15,000 was grafted to a latex having a volume average particle diameter of the rubber dispersion of 0.5 μm, a mass ratio of ethylene/propylene of 56/44, a weight average molecular weight of $30 \times 10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-ii) A graft copolymer in which a polystyrene with a number average molecular weight of 15,000 was grafted to a latex having a volume average particle diameter of the rubber dispersion of 0.2 μm, a mass ratio of ethylene/propylene of 56/44, a weight average molecular weight of $30 \times 10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-iii) A graft copolymer in which a polystyrene with a number average molecular weight of 15,000 was grafted to a latex having a volume average particle diameter of the rubber dispersion of 1.0 μm, a mass ratio of ethylene/propylene of 56/44, a weight average molecular weight of $30\times10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-iv) A graft copolymer in which a polystyrene with a number average molecular weight of 8,000 was grafted to a latex having a volume average particle diameter of the rubber dispersion of 0.5 μm, a mass ratio of ethylene/propylene of 56/44, a weight average molecular weight of $30\times10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-v) A graft copolymer in which a polystyrene with a number average molecular weight of 15,000 was grafted to a latex having a volume average particle diameter of the rubber dispersion of 0.5 μm, a mass ratio of ethylene/propylene of 56/44, a weight average molecular weight of $30\times10^4$, a molecular weight distribution of 2.2, and a gel content ratio of 30% by mass; in which the mass ratio of latex/polystyrene was 50/50 (the mass ratio of ethylene propylene rubber/polystyrene was 28/72)

(b-vi) A graft copolymer in which a polystyrene with a number average molecular weight of 15,000 was grafted to a latex having a volume average particle diameter of the rubber dispersion of 0.5 μm, a mass ratio of ethylene/propylene of 56/44, a weight average molecular weight of $30\times10^4$, a molecular weight distribution of 2.2, and a gel content ratio of 50% by mass; in which the mass ratio of latex/polystyrene was 70/30 (the mass ratio of ethylene propylene rubber/polystyrene was 40/60)

(b-vii) A graft copolymer in which a polystyrene with a number average molecular weight of 15,000 was grafted to a latex having a volume average particle diameter of the rubber dispersion of 0.1 μm, a mass ratio of ethylene/propylene of 56/44, a weight average molecular weight of $30\times10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-viii) A graft copolymer in which a polystyrene with a number average molecular weight of 15,000 was grafted to a latex having a volume average particle diameter of the rubber dispersion of 1.1 μm, a mass ratio of ethylene/propylene of 56/44, a weight average molecular weight of $30\times10^4$, a molecular weight distribution of 2.2, and a gel content ratio of 50% by mass; in which the mass ratio of latex/polystyrene was 50/50 (the mass ratio of ethylene propylene rubber/polystyrene was 28/72)

(b-ix) A graft copolymer in which a polystyrene with a number average molecular weight of 15,000 was grafted to a latex having a volume average particle diameter of the rubber dispersion of 0.5 μm, a mass ratio of ethylene/propylene of 56/44, a weight average molecular weight of $30\times10^4$, a molecular weight distribution of 2.2, and a gel content ratio of 25% by mass; in which the mass ratio of latex/polystyrene was 50/50 (the mass ratio of ethylene propylene rubber/polystyrene was 28/72)

—(c) First Hydrogenated Block Copolymer—

An unmodified block copolymer was synthesized which had a polymer block A1 constituted from polystyrene and a polymer block B1 constituted from polybutadiene. The physical properties of the obtained block copolymer were as follows.

Mixture of the following (c-1) and (c-2):

(c-2): The content of polystyrene in the block copolymer prior to hydrogenation: 30% by mass; the molecular weight peak of the block copolymer after hydrogenation: 65,000; the number average molecular weight (Mn) of polystyrene blocks: 19,500; the number average molecular weight (Mn) of polybutadiene blocks: 45,500; the molecular weight distribution (Mw/Mn) of the block copolymer prior to hydrogenation: 1.10; the 1,2-vinyl bonding amount (total vinyl bonding amount) in a polybutadiene block prior to hydrogenation: 40%; the hydrogenation ratio to polybutadiene parts constituting the polybutadiene block: 35%; and the glass transition temperature of the polybutadiene block after hydrogenation: −80° C.

(c-1): The content of polystyrene in the block copolymer prior to hydrogenation: 30% by mass; the molecular weight peak of the block copolymer after hydrogenation: 125,000; the number average molecular weight (Mn) of polystyrene blocks: 18,750; the number average molecular weight (Mn) of polybutadiene blocks: 87,500; the molecular weight distribution (Mw/Mn) of the block copolymer prior to hydrogenation: 1.10; the 1,2-vinyl bonding amount (total vinyl bonding amount) in a polybutadiene block prior to hydrogenation: 40%; the hydrogenation ratio to polybutadiene parts constituting the polybutadiene block: 35%; and the glass transition temperature of the polybutadiene block after hydrogenation: −80° C.

Mixing ratio (c-1):(c-2)=30:70

The content of the vinylarene compound was measured by using an ultraviolet spectrophotometer. The number average molecular weight (Mn) and the molecular weight peak were determined using GPC (mobile phase: chloroform; standard substance: polystyrene). The molecular weight distribution (Mw/Mn) was calculated by determining the weight average molecular weight (Mw) by GPC (mobile phase: chloroform; standard substance: polystyrene) according to a conventionally known method, and then dividing the weight average molecular weight (Mw) by the number average molecular weight (Mn). The total vinyl bonding amount was calculated according to the method as described in Analytical Chemistry, Volume 21, No. 8, August 1949, by measuring with an infrared spectrophotometer. The hydrogenation ratio was measured by using a nuclear magnetic resonance (NMR) apparatus. The mixing ratio was determined from the ratio of peak areas obtained from the GPC measurements.

—(d) Olefinic Copolymer—

(d-i): Ethylene-butene copolymer, product name: TAMER DF610 manufactured by Mitsui Chemicals, Inc.; the MFR: 1.2 g/10 minutes (under the conditions of 190° C. and 2.16 kgf); the brittleness temperature: <−70° C.; and the density: 0.862 g/cm$^3$ (d-ii): Ethylene-butene copolymer, product name: TAFMER DF810 manufactured by Mitsui Chemicals, Inc.; the MFR: 1.2 g/10 minutes (under the conditions of 190° C. and 2.16 kgf); the brittleness temperature: <−70° C.; and the density: 0.885 g/cm$^3$ (d-iii): Ethylene-butene copolymer, product name: TAFMER DF110 manufactured by Mitsui Chemicals, Inc.; the MFR: 1.2 g/10 minutes (under the conditions of 190° C. and 2.16 kgf); the brittleness temperature: <−70° C.; and the density: 0.905 g/cm$^3$ —(e) Second Hydrogenated Block Copolymer—

A block copolymer having a B-A-B-A block structure in which the polymer blocks A2 were constituted from polystyrene and the polymer blocks B2 were constituted from polybutadiene was synthesized by a well-known method. The synthesized block copolymer was hydrogenated by a well-known method. The polymer was not modified. The physical properties of the resultant unmodified hydrogenated block copolymer were as follows.

The content of polystyrene in the block copolymer prior to hydrogenation: 44% by mass; the number average molecular weight (Mn) of the block copolymer prior to hydrogenation: 95,000; the number average molecular weight (Mn) of polystyrene blocks: 41,800; the number average molecular weight (Mn) of polybutadiene blocks: 53,200; the molecular weight distribution (Mw/Mn) of the block copolymer prior to hydrogenation: 1.06; the total vinyl bonding amount (1,2-vinyl bonding amount) in the polybutadiene block prior to hydrogenation: 75%; the hydrogenation ratio to polybutadiene parts constituting the polybutadiene block: 99%; and the glass transition temperature of the polybutadiene block after hydrogenation: −15° C.

—(f) Phosphate Ester Compound—

(f): E890 (condensed phosphate ester compound) manufactured by Daihachi Chemical Industry Co., Ltd.

The measurement methods of physical properties (1) to (6) in Examples and Comparative Examples were as follows.

(1) Chemical Resistance

Produced resin composition pellets were fed into a small-sized injection molding machine (product name: IS-100GN, manufactured by Toshiba Machine Co., Ltd.), of which the cylinder temperature was set to 280° C., and were molded under conditions of a mold temperature of 70° C., an injection pressure of 75 MPa, an injection time of 20 seconds, and a cooling time of 15 seconds to obtain a flat plate of 150 mm×150 mm×3 mm.

A specimen of 75 mm×12.7 mm×3 mm was cut out from the flat plate and was set in a bending form designed to enable continuous variation of strain of the specimen. A phthalic ester compound (bis (2-ethylhexyl) phthalate, manufactured by Tokyo Kasei Kogyo Co., Ltd.) was applied onto the surface of the specimen and was left for 48 hours under conditions of 23° C. and a RH of 50%. After 48 hours had passed, strain was applied to the specimen and the end position of the bending form at which cracking of the surface of the specimen occurred was measured to determine the critical strain (%), which indicated the limit strain at which no cracking occurred.

The evaluation criterion was that the chemical resistance was determined to be better as the value of the critical strain was greater.

(2) Low-Temperature Impact Resistance

Produced resin composition pellets were fed into the small-sized injection molding machine (product name: IS-100GN, manufactured by Toshiba Machine Co., Ltd.), of which the cylinder temperature was set to 280° C., and were molded under conditions of a mold temperature of 70° C., an injection pressure of 70 MPa, an injection time of 20 seconds, and a cooling time of 10 seconds to obtain a flat plate of 50 mm×90 mm×2 mm.

The resultant flat plate was subjected to a drop impact test using a striker having a tip diameter of 12.7 mm in an environment of −30° C. in accordance with JIS K7211-1 to measure the entire absorption energy (J) required to break the test piece.

The low-temperature impact resistance was determined to be better as the value was greater.

(3) Tracking Resistance

Produced resin composition pellets were fed into the small-sized injection molding machine (product name: IS-100GN, manufactured by Toshiba Machine Co., Ltd.), of which the cylinder temperature was set to 280° C., and were molded under conditions of a mold temperature of 70° C. and an injection pressure of 70 MPa to obtain a flat plate of 120 mm×80 mm×3 mm.

A flat plate of 20 mm×20 mm×3 mm was cut out from the resultant flat plate, and the tracking resistance was evaluated by measuring the highest voltage (V) where a tracking breakdown did not occur according to IEC 60112:2003 (electrolytic solution used: Solution A; and the number of drops: 50 drops).

The tracking resistance was determined to be better as the value was greater.

(4) Vibration Fatigue Resistance Characteristic

Produced resin composition pellets were fed into the small-sized injection molding machine (product name: IS-100GN, manufactured by Toshiba Machine Co., Ltd.), of which the cylinder temperature was set to 280° C., and were molded under conditions of a mold temperature of 70° C. and an injection pressure of 65 MPa to obtain Type A cantilever bending fatigue test pieces for Method B of ASTM D671. Bending stresses (repetitive stresses: 50 MPa) that cyclically varied were repeatedly applied to each test piece under the following test conditions in accordance with Method B of ASTM D671, until the test piece was broken. For each resin composition, measurements of repetition counts were carried out for 5 test piece, and the repetition counts of the 5 samples were averaged.

Tester: Repeated bending vibration fatigue tester B-70 manufactured by Toyo Seiki Seisaku-sho, Ltd.

Repetition frequency: 30 Hz (repeating rate: 1800 times/minute) Measurement temperature: room temperature (23° C.)

(5) Flame Retardancy

Produced resin composition pellets were fed into the small-sized injection molding machine (product name: IS-100GN, manufactured by Toshiba Machine Co., Ltd.), of which the cylinder temperature was set to 280° C., and were molded under conditions of a mold temperature of 70° C. and an injection pressure of 60 MPa to prepare five specimens (thickness: 1.6 mm) for UL94 vertical burning test measurements. The flame retardancy of these five specimens was evaluated based on the UL94 vertical burning test method. A flame was brought into contact with each specimen for 10 seconds and then removed, and the burning time t1 (seconds) until a flame on the specimen extinguished after removal was measured. Thereafter, a flame was brought into contact with the specimen for 10 seconds once again and then removed, and the burning time t2 (seconds) until a flame on the specimen extinguished after removal was measured. For each of the five specimens, the average value of t1 and t2 was determined as the average burning time. Moreover, a longest burning time among the 10 measurements of t1 and t2 was determined as the longest burning time. A determination of V-0, V-1, V-2, or HB was made according to the UL94 standard.

In particular, a resin composition was determined to have an excellent flame retardancy when the flame retardancy level was determined to be V-1 or higher.

(6) Morphology

An ultrathin slice was made from an evaluation ISO dumbbell produced in the same manner as the sample for the (1) flexural modulus test using an ultramicrotome. The (b) component was then dyed using ruthenium tetraoxide and osmium tetraoxide. The dyed ultrathin slice was observed under a TEM (product name: HT7700, manufactured by Hitachi High-Technologies Corporation) to obtain an image at a magnification of ×2,500. From the observation of the obtained image, it was determined whether the (a) component formed a continuous phase in the resin composition. The result was evaluated as "G" (Good) if the (a) component formed a continuous phase (the case where the (a) component and the other component(s) was bicontinuous was included), or as "B" (Bad) if the (a) component formed a dispersed phase.

(7) Average Particle Diameter of Domains Containing (b) Component

From the TEM image (magnification: ×2,500) obtained in the above (6), an area (pixel number corresponding to a 20-μm square) to be binarized was selected. The selected image was smoothed using the median filter of ImageJ image processing software and was binarized using a threshold to obtain a binarized image. Upon the binarization, the default binarization algorithm and the auto threshold were used. Of closed areas that were turned black by the binarization, 100 granular regions having shortest diameters of 150 nm or more were selected as domains containing the (b) component. The longest diameter (μm) and the shortest diameter (ρ,m) of each selected domain were measured. For each particle, a particle diameter (μm) was determined by averaging the longest and shortest diameters measured. An average particle diameter was determined by averaging the particle diameters of the 100 selected particles.

Examples 1 to 16 and Comparative Examples 1 to 12

Each of Examples and Comparative Examples will be described in detail.

A twin screw extruder (ZSK-25 manufactured by Coperion Inc.) was used as a melt-kneading machine for producing a resin composition of each of Examples and Comparative Examples. The L/D of the extruder was 35.

The twin screw extruder was configured to include, in the direction of raw material flow, a first raw material feed inlet located on an upstream side, a first vacuum vent located downstream to the first raw material feed inlet, a second raw material feed inlet located downstream to the first vacuum vent, a liquid feed pump located downstream to the second raw material feed inlet, and a second vacuum vent located downstream to the liquid feed pump.

Pellets of each resin composition were produced at the barrel setting temperatures of the twin screw extruder from the first raw material feed inlet to the first vacuum vent of 320° C. and 280° C. on the downstream to the second raw material feed inlet, a screw rotation number of 300 rpm, and an extrusion rate of 15 kg/h. The configuration of the twin screw extruder is shown in Table 1.

TABLE 1

|  | 1st raw material feed inlet | | | | 1st vacuum vent | 2nd raw material feed inlet | Liquid feed pump | 2nd vacuum vent | | | |
|---|---|---|---|---|---|---|---|---|---|---|---|
| Setting Temp. | C1 | C2 | C3 | C4 | C5 | C6 | C7 | C8 | C9 | C10 | C11 | C12 |
| | | 320° C. | | | | | | | 280° C. | | | |

Pellets of each resin composition were obtained by feeding (a) to (f) components to the twin screw extruder that had been set as described above under the conditions summarized in Tables 2 and 3.

For each of Examples and Comparative Examples, physical property tests were carried out according to the above-described measurement methods (1) to (7). The results are summarized in Tables 2 and 3.

TABLE 2

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Production process of resin composition | 1st raw material feed inlet | Component (a-i) | mass pt. | 92 | 92 | 92 | 92 | 92 | 92 | 92 | 96 | 96 |
| | | Component (a-ii) | mass pt. | | | | | | | | | |
| | | Component (e) | mass pt. | | 5 | 5 | 5 | 5 | 5 | 5 | 5 | 5 |
| | 2nd raw material feed inlet | Component (b-i) | mass pt. | 8 | 8 | | | | | | 4 | 4 |
| | | Component (b-ii) | mass pt. | | | 8 | | | | | | |
| | | Component (b-iii) | mass pt. | | | | 8 | | | | | |
| | | Component (b-iv) | mass pt. | | | | | 8 | | | | |
| | | Component (b-v) | mass pt. | | | | | | 8 | | | |
| | | Component (b-vi) | mass pt. | | | | | | | 8 | | |
| | | Component (c) | mass pt. | | | | | | | | 4 | |
| | | Component (d-i) | mass pt. | | | | | | | | | 4 |
| | | Component (d-ii) | mass pt. | | | | | | | | | |
| | | Component (d-iii) | mass pt. | | | | | | | | | |
| | Liquid feed pump | Component (f) | mass pt. | | | | | | | | | |

TABLE 2-continued

| Evaluations | | | | | | | | | | | |
|---|---|---|---|---|---|---|---|---|---|---|---|
| (1) Chemical resistance (critical strain) | | % | 1.19 | 1.30 | 1.21 | 1.23 | 1.25 | 1.26 | 1.32 | 1.33 | 1.38 |
| (2) Low-temperature impact resistance (entire absorption energy) | | J | 22 | 31 | 24 | 23 | 25 | 22 | 28 | 33 | 29 |
| (3) Tracking resistance | | v | 525 | 575 | 550 | 550 | 575 | 575 | 575 | >600 | 575 |
| (4) Vibration fatigue resistance characteristic | | 10,000 times | 27.2 | 35.6 | 30.9 | 30.3 | 32.8 | 29.9 | 30.1 | 38.9 | 39.5 |
| (5) Flame retardancy | | Rank | — | — | — | — | — | — | — | — | — |
| (6) Morphology ((a) component forms continuous phase) | | — | G | G | G | G | G | G | G | G | G |
| (7) Average particle diameter of domains containing (b) component | | μm | 0.70 | 0.70 | 0.70 | 0.70 | 0.70 | 0.70 | 0.80 | 0.70 | 0.70 |

| | | | | | Example 10 | Example 11 | Example 12 | Example 13 | Example 14 | Example 15 | Example 16 |
|---|---|---|---|---|---|---|---|---|---|---|---|
| Production process of resin composition | 1st raw material feed inlet | Component (a-i) | | mass pt. | 96 | 96 | 96 | 96 | 96 | | 96 |
| | | Component (a-ii) | | mass pt. | | | | | | 96 | |
| | | Component (e) | | mass pt. | 5 | 5 | 5 | 5 | 5 | 5 | |
| | 2nd raw material feed inlet | Component (b-i) | | mass pt. | 4 | 4 | 4 | 4 | 4 | 4 | 4 |
| | | Component (b-ii) | | mass pt. | | | | | | | |
| | | Component (b-iii) | | mass pt. | | | | | | | |
| | | Component (b-iv) | | mass pt. | | | | | | | |
| | | Component (b-v) | | mass pt. | | | | | | | |
| | | Component (b-vi) | | mass pt. | | | | | | | |
| | | Component (c) | | mass pt. | | | | 4 | 4 | 4 | 4 |
| | | Component (d-i) | | mass pt. | | | | 4 | | 4 | 4 |
| | | Component (d-ii) | | mass pt. | 4 | | | | | | |
| | | Component (d-iii) | | mass pt. | | | 4 | | | | |
| | Liquid feed pump | Component (f) | | mass pt. | | | | | 20 | 20 | 20 |
| Evaluations | | (1) Chemical resistance (critical strain) | | % | 1.39 | 1.41 | 1.35 | 1.27 | 1.30 | 1.24 | 1.29 |
| | | (2) Low-temperature impact resistance (entire absorption energy) | | J | 31 | 32 | 35 | 27 | 30 | 25 | 27 |
| | | (3) Tracking resistance | | v | 575 | >600 | >600 | >600 | >600 | >600 | 550 |
| | | (4) Vibration fatigue resistance characteristic | | 10,000 times | 40.0 | 41.6 | 36.7 | 34.8 | 32.1 | 32.9 | 39.8 |
| | | (5) Flame retardancy | | Rank | — | — | — | v-0 | v-0 | v-0 | — |
| | | (6) Morphology ((a) component forms continuous phase) | | — | G | G | G | G | G | G | G |
| | | (7) Average particle diameter of domains containing (b) component | | μm | 0.70 | 0.70 | 0.70 | 0.80 | 0.70 | 0.70 | 0.70 | mass pt. = parts by mass

TABLE 3

| | | | | | Comp. Example 1 | Comp. Example 2 | Comp. Example 3 | Comp. Example 4 | Comp. Example 5 | Comp. Example 6 |
|---|---|---|---|---|---|---|---|---|---|---|
| Production process of resin composition | 1st raw material feed inlet | Component (a-i) | | mass pt. | 50 | 92 | 92 | 92 | 96 | 96 |
| | | Component (a-ii) | | mass pt. | | | | | | |
| | | Component (e) | | mass pt. | 5 | 5 | 5 | 5 | 5 | 5 |

TABLE 3-continued

|  |  |  |  |  |  |  |  |  |  |
|---|---|---|---|---|---|---|---|---|---|
|  | 2nd raw material feed inlet | Component (b-i) | mass pt. | 50 |  |  |  |  |  |
|  |  | Component (b-vii) | mass pt. |  | 8 |  |  | 4 |  |
|  |  | Component (b-viii) | mass pt. |  |  | 8 |  |  | 4 |
|  |  | Component (b-ix) | mass pt. |  |  |  | 8 |  |  |
|  |  | Component (c) | mass pt. |  |  |  |  | 4 | 4 |
|  |  | Component (d-iii) | mass pt. |  |  |  |  |  |  |
|  | Liquid feed pump | Component (f) | mass pt. |  |  |  |  |  |  |
| Evaluations | (1) Chemical resistance (critical strain) |  | % | 1.51 | 1.08 | 1.09 | 1.10 | 1.10 | 1.12 |
|  | (2) Low-temperature impact resistance (entire absorption energy) |  | J | 25 | 18 | 19 | 18 | 20 | 21 |
|  | (3) Tracking resistance |  | v | >600 | 500 | 500 | 500 | 500 | 500 |
|  | (4) Vibration fatigue resistance characteristic |  | 10,000 times | 8.2 | 22.5 | 21.8 | 21.2 | 23.5 | 23.2 |
|  | (5) Flame retardancy |  | Rank | — | — | — | — | — | — |
|  | (6) Morphology ((a) component forms continuous phase) |  |  | B | G | G | G | G | G |

|  |  |  |  | Comp. Example 7 | Comp. Example 8 | Comp. Example 9 | Comp. Example 10 | Comp. Example 11 | Comp. Example 12 |
|---|---|---|---|---|---|---|---|---|---|
| Production process of resin composition | 1st raw material feed inlet | Component (a-i) | mass pt. | 96 | 96 | 96 | 96 | 96 | 96 |
|  |  | Component (a-ii) | mass pt. |  |  |  |  |  |  |
|  |  | Component (e) | mass pt. | 5 | 5 | 5 | 5 | 5 | 5 |
|  | 2nd raw material feed inlet | Component (b-i) | mass pt. |  |  |  |  |  |  |
|  |  | Component (b-vii) | mass pt. |  | 4 |  |  | 4 | 4 |
|  |  | Component (b-viii) | mass pt. |  |  | 4 |  |  |  |
|  |  | Component (b-ix) | mass pt. | 4 |  |  | 4 |  |  |
|  |  | Component (c) | mass pt. | 4 |  |  |  | 4 | 4 |
|  |  | Component (d-iii) | mass pt. |  | 4 | 4 | 4 | 4 | 4 |
|  | Liquid feed pump | Component (f) | mass pt. |  |  |  |  |  | 20 |
| Evaluations | (1) Chemical resistance (critical strain) |  | % | 1.13 | 1.14 | 1.16 | 1.18 | 1.25 | 1.20 |
|  | (2) Low-temperature impact resistance (entire absorption energy) |  | J | 22 | 19 | 19 | 20 | 24 | 22 |
|  | (3) Tracking resistance |  | v | 500 | 500 | 500 | 500 | 550 | 550 |
|  | (4) Vibration fatigue resistance characteristic |  | 10,000 times | 22.0 | 24.0 | 23.9 | 22.5 | 24.0 | 23.3 |
|  | (5) Flame retardancy |  | Rank | — | — | — | — | — | v-0 |
|  | (6) Morphology ((a) component forms continuous phase) |  |  | G | G | G | G | G | G | mass pt. = parts by mass

As summarized in Tables 2 and 3, it was found that the resin compositions of Examples had excellent low-temperature impact resistances, chemical resistances, and tracking resistances, and had vibration fatigue resistance characteristics suitable for applications of mechanical parts and structural bodies, as compared to the resin compositions of Comparative Examples.

INDUSTRIAL APPLICABILITY

In accordance with the present disclosure, a resin composition and a molded article are obtained which have excellent low-temperature impact resistance, chemical resistance, and tracking resistance, and have a vibration fatigue resistance characteristic suitable for applications of mechanical parts and structural bodies. A molded article containing the resin composition of the present disclosure can be suitably used for automotive components, interior and exterior components of electrical apparatuses, other components, and the like.

The invention claimed is:
1. A resin composition comprising:
(a) a polyphenylene ether resin; and
(b) a graft copolymer wherein 30% by mass to 70% by mass of an ethylene-α-olefin copolymer rubber latex having a gel content ratio of 30% by mass to 90% by mass and a volume average particle diameter of a rubber dispersion of 0.2 µm to 1.0 µm is graft-polymerized with 30% by mass to 70% by mass of an aromatic vinyl compound, wherein the (a) component forms a continuous phase, and wherein the graft polymerized aromatic vinyl compound in the (b) component has a number average molecular weight in terms of standard polystyrene measured by gel permeation chromatography (GPC) of 10,000 or more and 50,000 or less.

2. The resin composition of claim 1, further comprising (c) a first hydrogenated block copolymer, wherein the (c) component is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, and the polymer block B1 in the (c) component has a glass transition temperature of −50° C. or lower.

3. The resin composition of claim 1, wherein the aromatic vinyl compound in the (b) component is styrene or α-methyl styrene.

4. The resin composition of claim 1, further comprising (e) a second hydrogenated block copolymer, wherein the (e) component is a hydrogenated block copolymer in which at least a part of a block copolymer containing at least one polymer block A2 composed primarily of a vinylarene compound and at least one polymer block B2 composed primarily of a conjugated diene compound is hydrogenated, and/or a modified product of the hydrogenated block copolymer, and the polymer block B2 in the (e) component has a glass transition temperature of higher than −50° C.

5. The resin composition of claim 4, wherein
a proportion of a sum of 1,2-vinyl bonds and 3,4-vinyl bonds relative to double bonds in the conjugated diene compound unit included in the (e) component is more than 50% and 90% or less,
a content of the vinylarene compound unit in the (e) component is 30% by mass to 50% by mass, and
a hydrogenation ratio of double bonds in the conjugated diene compound unit contained in the (e) component is 80% to 100%.

6. The resin composition of claim 1, further comprising (d) an olefinic polymer constituted from an olefin excluding propylene.

7. The resin composition of claim 6, wherein the (d) component is an ethylene-1-butene copolymer.

8. The resin composition of claim 6, wherein the density of the (d) component is 0.90 g/cm³ or more.

9. The resin composition of claim 1, wherein a morphology having a continuous phase and a domain containing the (b) component is formed, and an average particle diameter of the domain is 0.3 µm to 2.0 µm.

10. The resin composition of claim 9, further comprising (c) a first hydrogenated block copolymer, wherein the (c) component is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer, and the polymer block B1 in the (c) component has a glass transition temperature of −50° C. or lower.

11. The resin composition of claim 9, wherein the aromatic vinyl compound in the (b) component is styrene or α-methyl styrene.

12. The resin composition of claim 9, further comprising (e) a second hydrogenated block copolymer, wherein the (e) component is a hydrogenated block copolymer in which at least a part of a block copolymer containing at least one polymer block A2 composed primarily of a vinylarene compound and at least one polymer block B2 composed primarily of a conjugated diene compound is hydrogenated, and/or a modified product of the hydrogenated block copolymer, and the polymer block B2 in the (e) component has a glass transition temperature of higher than −50° C.

13. The resin composition of claim 12, wherein
a proportion of a sum of 1,2-vinyl bonds and 3,4-vinyl bonds relative to double bonds in the conjugated diene compound unit included in the (e) component is more than 50% and 90% or less,
a content of the vinylarene compound unit in the (e) component is 30% by mass to 50% by mass, and
a hydrogenation ratio of double bonds in the conjugated diene compound unit contained in the (e) component is 80% to 100%.

14. The resin composition of claim 9, further comprising (d) an olefinic polymer constituted from an olefin excluding propylene.

15. The resin composition of claim 14, wherein the (d) component is an ethylene-1-butene copolymer.

16. The resin composition of claim 14, wherein the density of the (d) component is 0.90 g/cm³ or more.

17. A resin composition comprising:
(a) a polyphenylene ether resin;
(b) a graft copolymer wherein 30% by mass to 70% by mass of an ethylene-α-olefin copolymer rubber latex having a gel content ratio of 30% by mass to 90% by mass and a volume average particle diameter of a rubber dispersion of 0.2 µm to 1.0 µm is graft-polymerized with 30% by mass to 70% by mass of an aromatic vinyl compound; and
(c) a first hydrogenated block copolymer,
wherein the (a) component forms a continuous phase, and
wherein the (c) component contains a (c-1) hydrogenated block copolymer and a (c-2) hydrogenated block copolymer,
each of the (c-1) and (c-2) components is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer,
the polymer block B1 in each of the (c-1) and (c-2) components has a glass transition temperature of −70° C. or lower,
the molecular weight peak in terms of standard polystyrene measured by gel permeation chromatography (GPC) of the (c-1) component is located at 80,000 to 200,000, and that of the (c-2) component is located at 10,000 or more and less than 80,000
the content of the (a) component is 50 to 99 parts by mass and the content of the (b) component is 1 to 50 parts by mass, per 100 parts by mass of the total amount of the (a) and (b) components, and the content of the (c) component is 1 to 30 parts by mass per 100 parts by mass of the total amount of the (a) and (b) components.

18. A resin composition comprising:
(a) a polyphenylene ether resin;
(b) a graft copolymer wherein 30% by mass to 70% by mass of an ethylene-α-olefin copolymer rubber latex having a gel content ratio of 30% by mass to 90% by mass and a volume average particle diameter of a rubber dispersion of 0.2 μm to 1.0 μm is graft-polymerized with 30% by mass to 70% by mass of an aromatic vinyl compound; and
(c) a first hydrogenated block copolymer,
wherein the (a) component forms a continuous phase,
wherein a morphology having a continuous phase and a domain containing the (b) component is formed, and an average particle diameter of the domain is 0.3 μm to 2.0 μm, and
wherein the (c) component contains a (c-1) hydrogenated block copolymer and a (c-2) hydrogenated block copolymer,
each of the (c-1) and (c-2) components is a hydrogenated block copolymer in which at least a part of a block copolymer containing at least one polymer block A1 composed primarily of a vinylarene compound and at least one polymer block B1 composed primarily of a conjugated diene compound is hydrogenated, and/or a modified product of the hydrogenated block copolymer,
the polymer block B1 in each of the (c-1) and (c-2) components has a glass transition temperature of −70° C. or lower,
the molecular weight peak in terms of standard polystyrene measured by gel permeation chromatography (GPC) of the (c-1) component is located at 80,000 to 200,000, and that of the (c-2) component is located at 10,000 or more and less than 80,000
the content of the (a) component is 50 to 99 parts by mass and the content of the (b) component is 1 to 50 parts by mass, per 100 parts by mass of the total amount of the (a) and (b) components, and
the content of the (c) component is 1 to 30 parts by mass per 100 parts by mass of the total amount of the (a) and (b) components.

* * * * *